United States Patent [19]
Johnson et al.

[11] Patent Number: 6,116,779
[45] Date of Patent: Sep. 12, 2000

[54] METHOD FOR DETERMINING THE TEMPERATURE OF SEMICONDUCTOR SUBSTRATES FROM BANDGAP SPECTRA

[76] Inventors: Shane R. Johnson, 742 E. Kesler La., Chandler, Ariz. 85225-6484; J. Thomas Tiedje, 1752 Wesbrook Crescent, Vancouver, British Columbia, Canada, V6T 1W1

[21] Appl. No.: 08/814,599

[22] Filed: Mar. 10, 1997

[51] Int. Cl.⁷ .................................................. G01K 11/00
[52] U.S. Cl. ........................................ 374/161; 374/120
[58] Field of Search .................................. 374/161, 120, 374/131

[56] References Cited

U.S. PATENT DOCUMENTS

| | | |
|---|---|---|
| 4,437,761 | 3/1984 | Kroger et al. ........................... 374/161 |
| 4,671,651 | 6/1987 | Toyoda et al. ........................... 374/161 |
| 4,703,175 | 10/1987 | Salour et al. ............................ 374/161 |
| 4,841,150 | 6/1989 | Walter ..................................... 374/161 |
| 4,979,133 | 12/1990 | Arima et al. ............................. 374/161 |
| 5,098,199 | 3/1992 | Amith ..................................... 374/161 |
| 5,118,200 | 6/1992 | Kirillov . |
| 5,213,985 | 5/1993 | Sandroff et al. ......................... 374/161 |
| 5,388,909 | 2/1995 | Johnson . |
| 5,568,978 | 10/1996 | Johnson . |

OTHER PUBLICATIONS

Hellman et al., "IR Transmission Spectroscopy of GaAs During Molecular Beam Epitaxy", J. Cryst. Growth 81, 38 (1987).

Weilmeier et al., "A New Optical Temperature Measurement Technique for Semiconductor Substrates in Molecular Beam Epitaxy", Can. J. Phys. 69, 422 (1991).

Lavoie et al., "Diffuse Optical Reflectivity Measurements on GaAs During Molecular Beam Epitaxy Processing", J. Vac. Sci. Technol. A 10, 930 (1992).

Johnson et al., "Temperature Dependence of the Urbach Edge in GaAs", J. Appl. Phys. 78, 5609 (1995).

Beaudoin et al., "Temperature Dependence of the Optical Absorption Edge in Indium Phosphide", Mat. Res. Soc. Symp. Proc.(1996).

DRS 1000 data sheet, Thermionics Northwest, 231–B Otto St., Port Townsend, WA 98368.(No date).

Shane R. Johnson, PhD Thesis, University of British Columbia, oral defense Mar. 11, 1996, thesis submitted to University of British Columbia Library, Mar. 15, 1996.

*Primary Examiner*—Diego Gutierrez
*Assistant Examiner*—Maria Fernandez

[57] ABSTRACT

An optical method for measuring the temperature of a substrate material with a temperature dependent band edge. In this method both the position and the width of the knee of the band edge spectrum of the substrate are used to determine temperature. The width of the knee is used to correct for the spurious shifts in the position of the knee caused by: (i) thin film interference in a deposited layer on the substrate; (ii) anisotropic scattering at the back of the substrate; (iii) the spectral variation in the absorptance of deposited layers that absorb in the vicinity of the band edge of the substrate; and (iv) the spectral dependence in the optical response of the wavelength selective detection system used to obtain the band edge spectrum of the substrate. The adjusted position of the knee is used to calculate the substrate temperature from a predetermined calibration curve. This algorithm is suitable for real-time applications as the information needed to correct the knee position is obtained from the spectrum itself. Using a model for the temperature dependent shape of the absorption edge in GaAs and InP, the effect of substrate thickness and the optical geometry of the method used to determine the band edge spectrum, are incorporated into the calibration curve.

19 Claims, 19 Drawing Sheets

METHOD FOR DETERMINING THE TEMPERATURE OF SEMICONDUCTOR SUBSTRATES FROM BANDGAP SPECTRA

FIELD OF THE INVENTION

This invention relates to thermometry and to methods and devices for making non-contact measurements of the temperature of semiconductor substrate materials in various process environments including molecular beam epitaxy, chemical vapor deposition, plasma assisted chemical vapor deposition, plasma etching, metal organic chemical vapor deposition, sputtering, and rapid thermal annealing.

BACKGROUND OF THE INVENTION

The substrate temperature is an important parameter in thin film deposition and semiconductor processing operations. The substrate temperature and its uniformity can have a large effect on the quality and composition of the deposited layers. In molecular beam epitaxy for example, the substrate wafer is normally heated radiatively and rotated during the thin film growth operation. Physical contact between the wafer and a temperature sensor is not practical nor desirable because the sensor itself would cause local perturbations in temperature or even contamination of the substrate. Even if the wafer is not rotating, and heating is accomplished by thermal contact with a temperature regulated support, the temperature of the substrate can deviate substantially from the temperature of the support because of thermal contact problems which frequently exist in typical vacuum processing environments. Thus a non-contact method for measuring the temperature of the substrate is needed.

The simplest non-contact temperature measurement technique is to place a thermocouple close to the substrate so that it is in radiative contact with the substrate. While this solution is simple and cheap its accuracy is not adequate. In fact in molecular beam epitaxy it is not uncommon to have temperature errors of 100° C. with this approach.

Optical pyrometry is another method for measuring the temperature of an object without touching it. However pyrometry has serious deficiencies for semiconductor processing applications. A pyrometer works by detecting the intensity of the thermal radiation that is emitted by any object that is not at the absolute zero of temperature (−273° C.). The spectrum of the thermal emission depends on the product of the spectral dependence of the emissivity of the object and the emission spectrum of a black body at that temperature. For the temperature range of interest in semiconductor processing, namely between about 0° C. and 1100° C., the peak in the blackbody spectrum is in the infrared. However the emissivity of semiconductors is normally low in the infrared because semiconductors are transparent at long wavelengths. This means that the radiation that must be detected by the pyrometer is relatively weak which limits the temperature range of the technique for semiconductors to >500° C. for standard commercial pyrometers such as the instrument manufactured by IRCON. The transparency of semiconductors in the infrared also means care must be taken not to inadvertently measure the temperature of whatever is behind the semiconductor substrate, usually the heater. Yet another complication with pyrometers has to do with losses in optical elements used to transport the substrate radiation to the detector. In semiconductor processing operations it is not uncommon for optical elements such as windows and mirrors to become coated during the process. This affects the intensity of the thermal radiation from the substrate that reaches the detector which causes temperature errors. While the pyrometer can be useful for semiconductor temperature measurements it is not the complete answer.

It has been recognized for some time that the bandgap of a semiconductor is a reliable indicator of the temperature of the semiconductor because the bandgap is typically a smooth, almost linear function of temperature, in the 0–1000° C. temperature range. Once the bandgap is known the temperature can be inferred from a one-time calibration for the particular material of interest. Various optical methods have been proposed for measuring the bandgap of the substrate. In the method of Hellman et al. (J. Cryst. Growth 81, 38 (1987)) the radiation from heater filaments behind the substrate is transmitted through the substrate and detected by a detector outside the process chamber. By measuring the spectrum of the transmitted light they are able to infer the bandgap and hence the temperature. This method suffers from the variability in the intensity of the heater radiation as a function of the temperature of the heater. For example at low temperatures the heater produces very little radiation which makes accurate temperature measurements difficult.

To solve this problem Kirillov et al. (U.S. Pat. No. 5,118,200) put a lamp behind the substrate as an additional, brighter source of radiation. This increases the sensitivity of the measurement but introduces additional complications in the heater design. Because it is not practical to rapidly modulate the intensity of the light behind the substrate, this technique is not compatible with lock-in detection techniques which means that it is not possible to exclude background light from hot filaments or effusion ovens that may also be radiating in the same spectral range. In addition, with a fixed light source internal to the process chamber it is difficult to spatially resolve the temperature across the substrate. Temperature uniformity is a critical problem in growth of reproducible device structures with high yield.

These problems were solved by Weilmeier et al. (Can. J. Phys. 69, 422 (1991)) who put the light source outside the process chamber and determined the bandgap from the spectrum of the back scattered light. In this method since the light source is outside the process chamber it does not interfere with the heater and is relatively easy to chop with a mechanical chopper. This makes lock-in detection techniques possible so that stray light from other sources can be rejected. To further enhance the sensitivity Weilmeier et al. textured the back surface of the substrate and placed the detector in a non-specular position. The important optical signal in measuring the bandgap is the signal which is transmitted through the substrate. The diffuse reflection technique of Weilmeier et al. detects only that part of the back scattered signal which has been transmitted through the substrate; the reflected signal from the front surface is specular and does not reach the detector which is located away from the specular reflection. This has the effect of eliminating the background signal reflected from the front surface of the substrate and thus reduces the sensitivity of the measurement to the surface properties of the substrate which are irrelevant as far as the temperature is concerned. A practical method for coupling the incident light into the growth chamber, and coupling the scattered light out of the growth chamber onto a photodetector using optical mirror ports and an optical fiber bundle has been demonstrated for the detection of scattered laser light by Lavoie et al. (J. Vac. Sci. Technol. A 10, 930 (1992)).

An elementary analysis method can be used to obtain a qualitative estimate of the bandgap from the diffuse reflection spectrum, for example by taking the wavelength where the diffuse reflectance is 50% of the peak value. Qualitatively the bandgap is at the wavelength where the diffusely scattered light intensity increases. However to determine the temperature accurately and reproducibly with a minimum of calibrations requires a precise procedure for finding an optical signature of the bandgap that can be related to the temperature. The point of inflection in the transmitted or reflected optical signal has been proposed by Kirillov et al. as such an optical signature in the case of specular optical signals. The point of inflection measures a point on the absorption spectrum that lies below the optical bandgap. For maximum accuracy it is desirable to measure a point on the optical spectrum as close to the bandgap as possible. This is because the absorption below the bandgap is variable depending on the quality of the material and the doping density as is well known in the art. For accurate measurements of the absolute temperature it is desirable to have a technique which is as insensitive as possible to properties of the material that can vary between different specimens.

To solve these problems, Johnson et al. (U.S. Pat. Nos. 5,388,909 and 5,568,978) incorporated herein by reference, fit an asymptotic function to the region of the diffuse reflectance spectra with positive curvature and use the position of the knee (one of the fitting parameters) as a reference for temperature. The knee wavelength is at the wavelength of the spectrum with the largest curvature, is close to the bandgap of the substrate material, and is less sensitive to factors that cause spurious shifts in the spectrum, such as variations in back surface texture of the substrate and the optical response of the optical thermometer. However, even small spurious shifts in the position of the knee may be interpreted as changes in temperature and hence may cause temperature errors. For example rotation of the substrate during growth of thin film interference can cause temperature errors of a few degrees. One of the purposes of this invention is to provide methods for correcting for these errors in temperature.

SUMMARY OF THE PRESENT INVENTION

This invention describes an optical method and apparatus for measuring the temperature of semiconducting or insulating substrates accurately and repeatably in real time that is useful for, but not limited to, measuring the temperature of semiconductor substrates in molecular beam epitaxy. In a preferred embodiment the substrate materials are gallium arsenide, indium phosphide or silicon single crystal wafers. Mathematical equations are provided that use the measured position of the knee and the width of the knee of the band edge spectrum of a substrate, to determine the temperature of that substrate. The band edge spectrum is measured either by transmission or by diffuse reflection. The position of the knee in the band edge spectrum is close to the bandgap of the substrate material (typically within 100 meV) and together with the width of the knee can be used to make an accurate determination of the temperature. In this invention we show how the width of the knee can be used to determine a corrected knee position from the measured knee position that corrects for shifts caused by: thin film interference in a deposited layer on the substrate; anisotropic scattering at the back of the substrate; the spectral variation of the absorptance of deposited layers that absorb in the vicinity of the band edge of the substrate; time variations in the optical throughput caused by substrate rotation; and the spectral dependence of the optical dependence of the wavelength selective detection system used to obtain the band edge spectrum of the substrate. The corrected knee position is used to calculate the tree substrate temperature from a predetermined calibration curve.

In this invention we also show how to correct the knee position for the effect of variations in the substrate thickness and the configuration of the optical measurement system. In this method the corrected knee position is determined by adding a term to the measured knee position, this term being proportional to the logarithm of the optical path length in the substrate material.

DESCRIPTION OF THE INVENTION

Introduction and Description of the Problem

Figure 1:
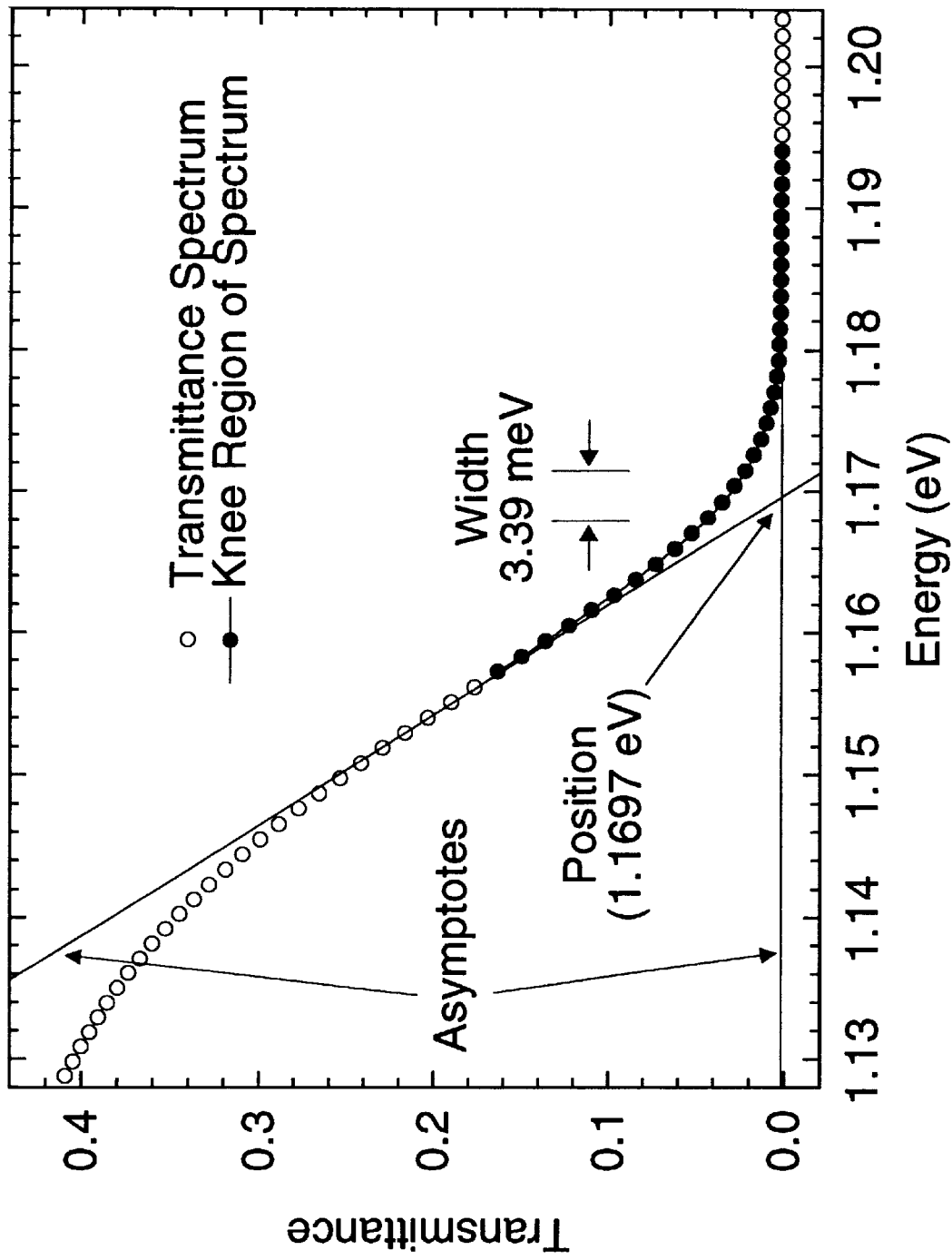
FIG. 1. Illustration of a fit to the knee region of a transmittance spectrum as a function of energy; the fitting function has an asymptotic linear behavior away from the knee of the spectrum. The substrate material is InP. The position and the width of the knee of the spectrum are shown. This figure describes prior art.

As critical dimensions in semiconductor devices have become progressively smaller and device designs progressively more sophisticated, the requirements for control over the fabrication processes have become more stringent. For example semiconductor lasers for telecommunications will in the near future contain quantum well or multiple quantum well structures in which the allowed tolerances on the individual layer thicknesses will be in the range of a few atomic layers. At the same time the composition of these layers will need to be controlled to of order 0.3% or better to obtain adequate lattice constant match to the substrate and desirable emission wavelengths. Ideally the optimum properties of the layers need to be held fixed over the entire surface of a 3 inch diameter wafer in order to achieve a high yield of good devices.

Semiconductor lasers are now manufactured from compound semiconductor alloys containing two to four different alloying elements from group II, III, V or VI in the periodic table. Thin epitaxial films of these materials are fabricated typically by chemical or physical vapor deposition techniques such as metal organic chemical vapor deposition or molecular beam epitaxy. In these deposition processes the temperature of the substrate during the epitaxial film growth affects the electronic properties of the film, such as the non-radiative recombination lifetime of electrons and holes. In the case of GaAs thin films the optimum growth temperature is near 600° C. while the optimum growth temperature for AlGaAs is higher, close to 700° C. In addition the temperature of the substrate affects the composition of the film. For example at the high temperatures needed to grow high quality AlGaAs the vapor pressure of the Ga is high enough that some of the deposited Ga evaporates. The fraction of the Ga which evaporates depends critically on the temperature so that even a few degrees change in the substrate temperature will change the composition of the film. Thus for high uniformity in the composition and electronic properties of the epitaxial layer it is important to have a controlled and uniform temperature during growth. To achieve this objective it is important to be able to determine substrate temperature at any location on the substrate quickly and accurately.

In the prior art, (U.S. Pat. Nos. 5,388,909 and 5,568,978) the content of which is incorporated herein by reference, substrate temperature was obtained from the spectral position of the knee of the diffuse reflectance spectrum. The position of the knee was determined by fitting the knee region of the spectrum with a function that has a linear asymptotic behavior away from the knee of the spectrum.

The position of the knee in the band edge spectrum is susceptable to small shifts caused by various sample or measurement geometry related factors. These factors can cause temperature errors on the order of 1–10° C. or larger. For example if the illumination source is on one side of the substrate and the detector is on the other side, the knee position will be shifted slightly from the position it would have if the illumination source and detector were on the same side. In the former case the apparatus measures the transmittance spectrum of the sample while in the latter case the apparatus measures diffuse reflectance spectrum.

Other factors which can cause the knee position to shift are the texture on the back surface of the substrate, thin films with a different index of refraction deposited on the front, and time or spectral variations in the throughput of the detection system. The method for dealing with variations in the characteristics of the substrate, in the prior art (U.S. Pat. Nos. 5,568,978 and 5,388,909, the content of which is incorporated herein by reference), was to generate a separate calibration curve for each group of substrates, even when the fundamental materials properties of the substrate did not change. In this invention we show how to correct for the effects of variations in the physical characteristics of the substrate, on the temperature inferred from band edge thermometry. The material presented here describes a new and useful method for obtaining substrate temperature from the band edge spectra of substrates with temperature dependent bandgaps such as silicon, GaAs and InP.

In the following discussion the effects of varying substrate thickness, light scattering, and reflectivity, on the sensitivity and accuracy of the band edge thermometry, is explained. Also discussed is the effect of variations in, the width of the absorption edge, the spectral response of the detection system, and the configuration of the measurement (diffuse reflectance or transmittance), on algorithms that extract temperature from the spectrum. In this invention an algorithm is developed that uses the width of the knee to reduce the sensitivity of the temperature given by the position of the knee, to variations in the properties of the substrate, and thereby improve the accuracy of the temperature measurements.

Definition of the Knee and Width of the Knee in the Band Edge Spectrum

In general an equation that has a linear asymptotic behavior away from the knee can be fit to any band edge spectrum of the substrate. In particular the asymptotic equation can be fit to either the diffuse reflectance spectrum or the transmittance spectrum. Furthermore, these spectra can be plotted in terms of photon wavelength or photon energy. In a preferred embodiment, the exponential knee equation is fit to the band edge spectrum. The Exponential Knee Equations have the following form:

$$y = y_o + m_2 E_a \ln\left(1 + \exp\left(\frac{(E_k - hv)}{E_a}\right)\right); \quad (1a)$$

$$y = y_o + m_3 \lambda_a \ln\left(1 + \exp\left(\frac{(\lambda - \lambda_k)}{\lambda_a}\right)\right),$$

for spectra plotted in terms of energy or wavelength, respectively. In these equations $E_k$ and $\lambda_k$ are are the measured knee positions in the wavelength and energy spectra respectively. $E_a$ and $\lambda_a$ are the widths of the knees and $m_2$ and $m_3$ are the slopes of the band edge spectra, plotted as a function of photon energy and wavelength respectively. $y_o$ is the background signal. Other functional forms with linear asymptotes can also be used to fit the band edge spectrum. For example, the power-law knee equation, $$y = y_o + m_2 n E_{ab} \left[ \left( 1 + \left\{ \frac{1}{2} \left| 1 + E_{kb} - \frac{hv}{nE_{ab}} \right| + \left( \left( \frac{1}{2} \left( 1 + \frac{E_{kb} - hv}{nE_{ab}} \right)^n \right) \right)^{\frac{1}{n}} \right\} \right) - 1 \right] \quad (1b)$$

where n is a number greater than one, also has linear asymptotes for hv large or small compared with $E_k$. Similarly another expression with linear asymptotes for large $|E_k-hv|$ is the hyperbolic knee equation, $$y = y_{0c} + \frac{m_2 E_{ac}}{2} \left[ \frac{(E_{kc} - hv)}{E_{ac}} + \left\{ 1 + \left| \left( \frac{E_{kc} - hv}{E_{ac}} \right)^n \right| \right\}^{\frac{1}{n}} \right] \quad (1c)$$

where n is a number greater than one. The position of the knee and the width of the knee in Eq. 1b and 1c are given by $E_{kb}$, $E_{kc}$ and $E_{ab}$, $E_{ac}$ respectively. The use of the variable n as an exponent in Eqs. 1b, 1c should not be confused with the use of the same variable n later in this document as the index of refraction of the substrate.

In Eq. 1a the position of the knee is given by $E_k$ (energy) or $\lambda_k$ (wavelength) and the width of the knee is given by $E_a$ (energy) or $\lambda_a$ (wavelength). These fitting parameters are independent of the magnitude of the diffuse reflectance or transmittance signal. In these equations, wavelength is represented by $\lambda$ while energy is represented by E or hv. The width of the knee is used to correct for spurious shifts in the position of the knee, caused by: thin film interference, variations in scattering during measurements on textured substrates, absorptance variations in the vicinity of the band edge of the substrate during the deposition of small bandgap overlayers, and any variation in the optical response of the energy or wavelength selective detection system.

Figure 2:
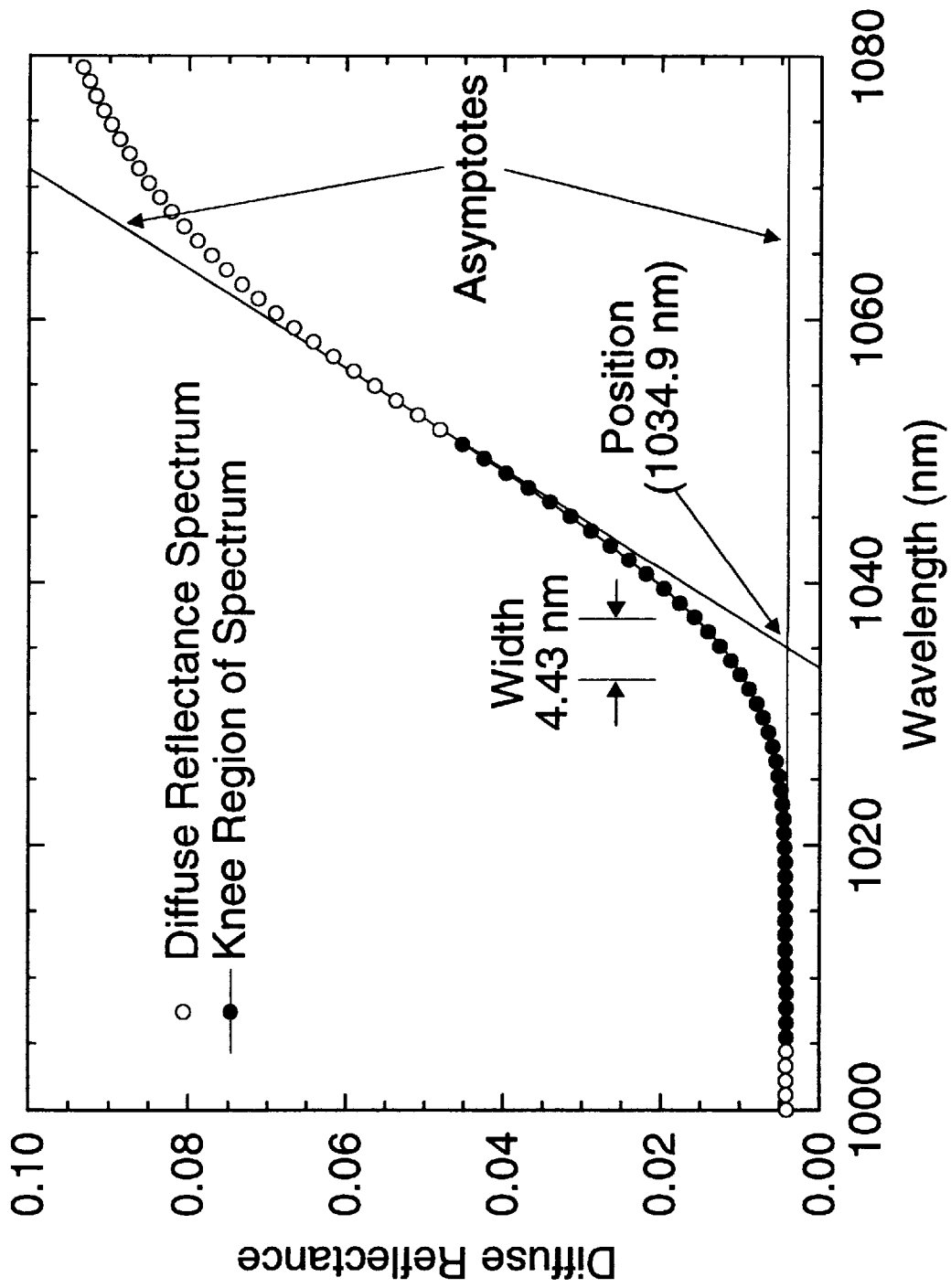
FIG. 2. Illustration of a fit to the knee region of a diffuse reflectance spectrum as a function of wavelength; the fitting function has an asymptotic linear behavior away from the knee of the spectrum. The substrate material is GaAs. The position and the width of the knee of the spectrum are shown. This figure describes prior art.

The ability of the equations, in Eq. 1a, to capture the shape and the position of the onset of transparency (or the band edge) of the substrate is illustrated in FIGS. 1 and 2. In FIG. 1, the transmittance spectrum from an InP substrate at 337° C., is plotted in terms of energy. In FIG. 2, the diffuse reflectance spectrum from a GaAs substrate at 332° C., is plotted in terms of wavelength. The asymptotes of Eq. 1a are: $y=y_o$ and $y=y_o+m_2(E_k-hv)$ in terms of energy and $y=y_o$ and $y=y_o+m_3(\lambda-\lambda_k)$ in terms of wavelength. The asymptotes intersect at the position of the knee, $E_k$ or $\lambda_k$.

Effect of Substrate Scattering Characteristics, Thickness and Measurement Geometry on the Bandgap Spectrum One of the most important substrate characteristics related to optical bandgap thermometry, is the diffuse scattering and trapping of light inside of substrates that have textured surfaces. This characteristic of the substrate can change during growth. A theoretical model for diffuse reflectance in terms of the thickness, reflectivity, and absorption coefficient of the substrate was developed by Weilmeier et al. (Can. J. Phys. 69, 422 (1991)). In Weilmeier's model the back surface of the substrate is assumed to be textured in such a way that scattering from the back surface has a Lambertian angular distribution or cosine law. This is the angular distribution one would expect for a perfectly scattering surface. In this case the diffuse reflectance spectrum is given by, $$R_{diff} = \frac{R_b(1 - R_f)^2 \exp(-2\alpha d)}{n^2 - R_f R_b \exp(-2\alpha d) - (n^2 - 1)\exp(-4\alpha d)}, \quad (2)$$

where the absorption coefficient, $\alpha$, is a function of wavelength (or energy), n is the index of refraction of the substrate, $R_f$ is the front surface reflectivity, $R_b$ is the back surface reflectivity, and d is the substrate thickness.

Figure 3:
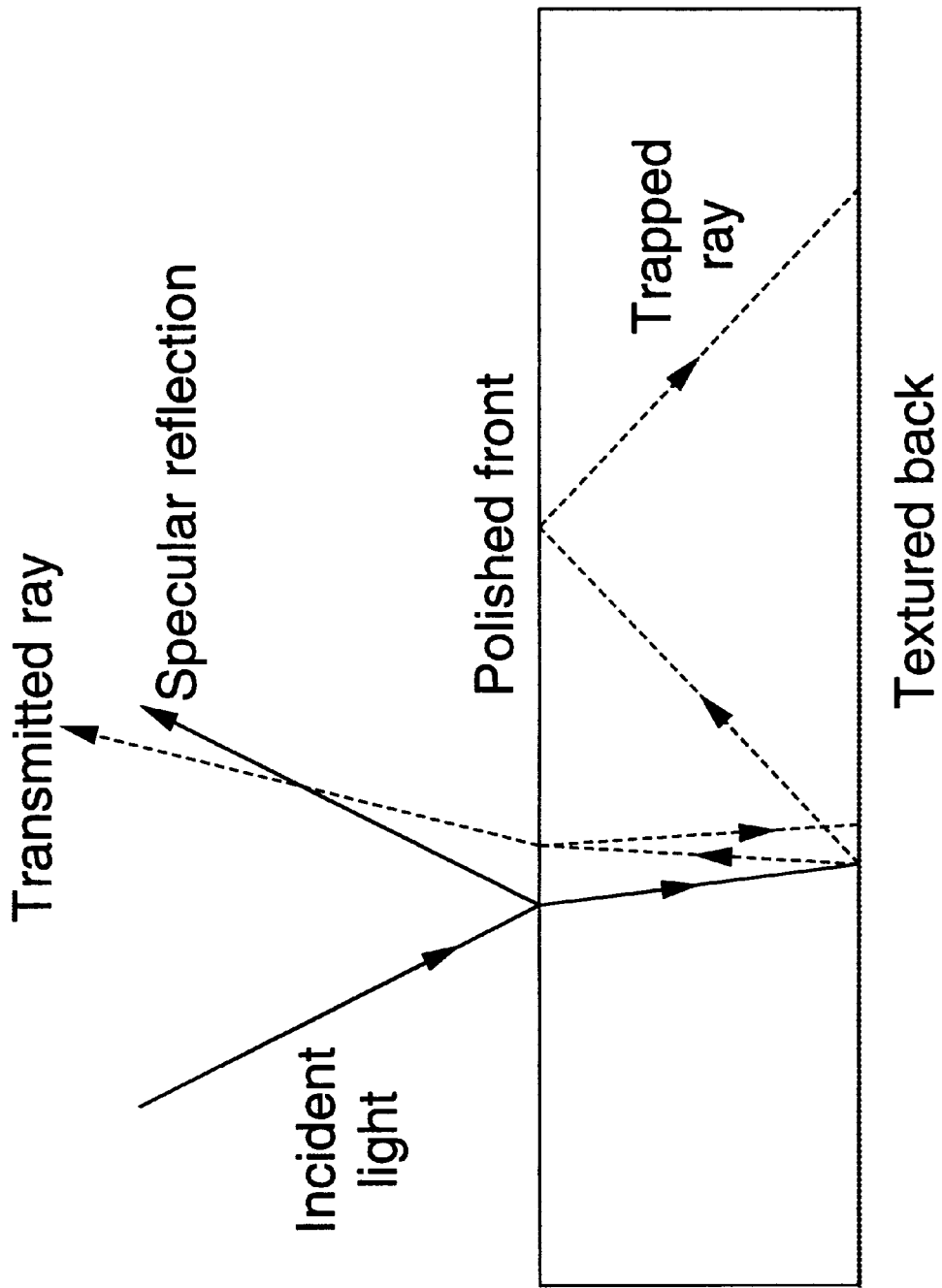
FIG. 3. Ray tracing diagram for light scattered from a textured surface.

In the present patent the diffuse scattering model is extended to include back surfaces that are less than perfect scatterers or even polished. In this model (see FIG. 3), scattering from the rough back surface of the substrate is represented by two rays; one which is scattered into the escape cone and escapes from the substrate and one which is scattered at an angle greater than the critical angle for total internal reflection. The angle of the escape cone (or critical angle) is $$\sin(\theta_c) = \frac{1}{n} \text{ or } \cos(\theta_c) = \sqrt{1 - \frac{1}{n^2}}. \quad (3)$$

Of the light incident on the substrate, the fraction $$R_b(1-R_f)\exp(-\alpha d_s) \quad (4)$$

is scattered from the back surface of the substrate. Of this light the fraction $f_e$ is scattered into the escape cone, and of this fraction, the fraction $$(1-R_f)\exp(-\alpha d_d) \quad (5)$$

is transmitted out through the front surface. Of the fraction in Eq. 4, the fraction $f_t$ (represented by the trapped ray in FIG. 3) is trapped inside the substrate. It is assumed that this trapped ray cannot escape either surface without scattering again. When the trapped ray strikes the textured back, a fraction $f_e$ is scattered into the escape cone while a fraction $f_t$ remains trapped. Similarly, when the portion of the ray left in the escape cone (after reflection from the front surface) strikes the textured back, a fraction $f_t$ is trapped while a fraction $f_e$ remains in the escape cone.

Since the index of refraction in semiconductors is large, the paths of the incident and transmitted light rays inside the substrate are close to normal. Therefore the path lengths $d_s$ and $d_d$ are in general approximately equal to the thickness of the substrate. For example, when the angle of incidence is 23° to the normal the internal angle is 6.4° to the normal and an internal path length is 1.006 times the substrate thickness, for GaAs substrates.

The mathematical terms used to describe the scattering process can be complex. However, noting that the fraction of light scattered from the textured back surface that survives to scatter again is $$y_s = f_e R_f R_b \exp(-2\alpha d_e) + f_t \exp(-2\alpha d_t), \quad (6)$$

the multiple reflections are given by a power series in $y_s$ and the explicit handling of cross terms is eliminated. Here $2d_e$ and $2d_t$ are the average round trip path lengths of the rays in the escape cone and the rays that are trapped.

The total diffuse reflectance (given by the product of $f_e$, Eq. 4, Eq. 5, and the multiple reflections of $y_s$) is $$DRS_w = f_e R_b (1-R_f)^2 \exp(-\alpha d_s) \exp(-\alpha d_d)[1+y_s+y_s^2+\ldots]. \quad (7)$$

Defining $\beta_S = f_t/f_e$, summing the power series, and noting $f_t = 1-f_e$, Eq. 7 becomes $$DRS_w = \frac{R_b(1-R_f)^2 \exp(-\alpha d_s)\exp(-\alpha d_d)}{1 - R_b R_f \exp(-2\alpha d_e) + \beta_s(1 - \exp(-2\alpha d_t))}. \quad (8)$$

The effect on the diffuse reflectance from the light scattered outside of the escape cone is $$g_s = \beta_s (1 - \exp(-2\alpha d_t)). \quad (9)$$

In general the scattering distribution from a rough surface can be represented by a function that narrows as the scattering from the surface becomes more specular. A cosine function with this property is $$S(\theta) = (\cos \theta)^{1/\gamma}, \quad (10)$$

where the limit $\gamma=0$ represents a specular surface and the limit $\gamma=1$ represents the maximal scattering Lambertian surface. For a two dimensional surface the probability that light at normal incidence is scattered at an angle $\theta$, to the normal, is $$P(\theta) = (1/\gamma+1)(\cos\theta)^{1/\gamma} \sin\theta. \quad (11)$$

Of the scattered light, the fraction in the escape cone and the fraction trapped are $$f_e = \int_0^{\theta_c} P(\theta)d\theta = [1 - (\cos\theta_c)^{1/\gamma+1}]$$
$$= \left[1 - \left(1 - \frac{1}{n^2}\right)^{(1/\gamma+1)/2}\right]; \quad (12)$$

$$f_t = \int_{\theta_c}^{\pi/2} P(\theta)d\theta = (\cos\theta_c)^{1/\gamma+1} = \left(1 - \frac{1}{n^2}\right)^{(1/\gamma+1)/2}.$$

The path length of a ray traversing the substrate at the angle $\theta$ is $l(\theta) = d/\cos\theta$; the average path lengths of the rays in the escape cone and the trapped rays are, $$d_e = \int_0^{\theta_c} P(\theta)l(\theta)d\theta = (1+\gamma)d\frac{1-(\cos\theta_c)^{1/\gamma}}{1-(\cos\theta_c)^{1/\gamma+1}} \quad (13)$$

$$\cong \begin{cases} d\left(1 + \frac{1}{4n^2} + \frac{(7\gamma-1)}{3\gamma}\frac{1}{16n^4}\right) & \text{for } .02 \leq \gamma \leq 1 \\ d\left(1 + \gamma - \frac{1}{2n^2}\exp\left(-\frac{1}{2n^2\gamma}\right)\right) & \text{for } \gamma \ll 1 \end{cases} \cong d$$

$$d_t = \int_{\theta_c}^{\pi/2} P(\theta)l(\theta)d\theta = \frac{(1+\gamma)d}{\cos\theta_c}$$
$$\cong (1+\gamma)d\left(1 + \frac{1}{2n^2}\right) \cong (1+\gamma)d.$$

Hence the diffuse reflectance becomes $$DRS_w = \frac{R_b(1-R_f)^2 \exp(-2\alpha d)}{1 - R_b R_f \exp(-2\alpha d) + \beta_s(1 - \exp(-2(1+\gamma)\alpha d))}, \quad (14)$$

where $$\beta_s = \left(\left(1 - \frac{1}{n^2}\right)^{-(1/\gamma+1)/2} - 1\right)^{-1}. \quad (15)$$

In the Lambertian limit $\gamma=1$, $\beta_s = n^2-1$ and Eq. 14 reduces to Eq. 2. In the specular limit $\gamma=0$, $\beta_s=0$ and Eq. 14 reduces to the well known contribution of the back surface to the reflectance of a polished semi-transparent slab.

Figure 4:
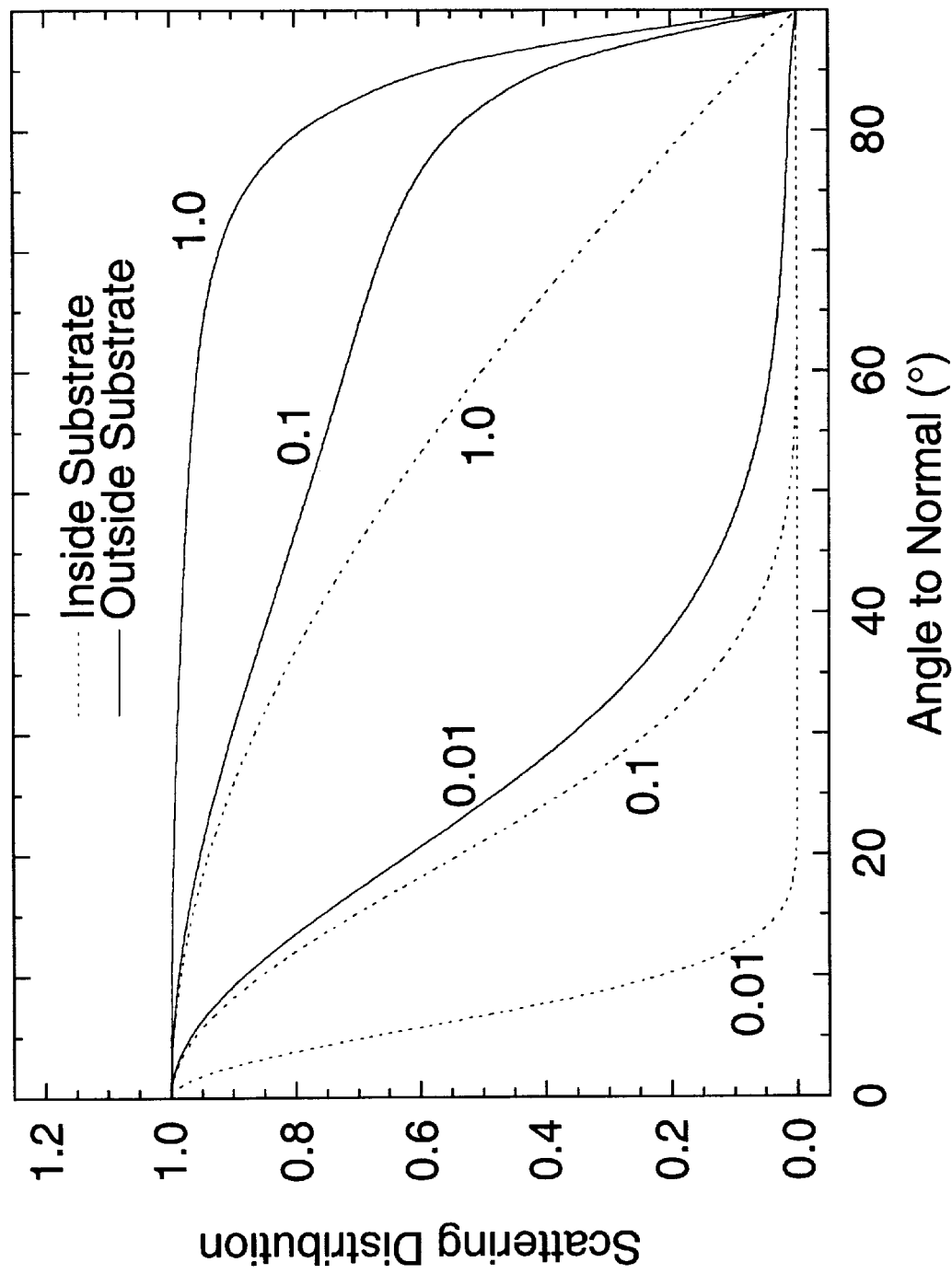
FIG. 4. The distributions of scattered light inside the substrate (dashed lines) and transmitted through the front surface of the substrate (solid lines), for scattering parameters 0.01, 0.1, and 1.0.

The scattering distributions of rays inside and outside the substrate are shown in FIG. 4, for scattering parameters, $\gamma=0.01$, 0.1, and 1.0. The distribution of the rays inside the substrate is given by Eq. 10 while the distribution of the rays outside the substrate is given by Eq. 10 corrected for refraction and variations in transmission at the GaAs-vacuum interface. The angle to the normal outside the substrate, $\theta_o$, is given by Snell's law: $n \sin\theta = \sin\theta_o$. The angular dependence of the transmission through the GaAs-air interface is given by the Fresnel equations for randomly polarized light. For $0.1 < \gamma \leq 1.0$ and angles less than 65° the distribution of light outside the substrate is fairly uniform. For angles greater than 65° the angular dependence of the transmission becomes important. For large values of $\gamma$ the denominator of Eq. 14 and hence the diffuse reflectance signal is dominated by light trapping.

Eq. 14 ($DRS_w$) gives the fraction of the incident light that is transmitted back out the front of the substrate over the entire solid angle $2\pi$. The light detected at an angle $\theta_o$, and smaller solid angle $\Omega_o$ is, $$DRS_s = \left[\frac{1}{\gamma} + 1/2\pi\left(1 - \left(1 - \frac{1}{n^2}\right)^{(1/\gamma+1)/2}\right)\right]DRS_w\left(1 - \frac{\sin^2\theta_o}{n^2}\right)^{1/2\gamma}\Omega_o, \quad (16)$$

where the scattering distribution is written in terms of the external angle, $\theta_o$. The normalization of Eq. 16 is confirmed by $$\int_0^{2\pi}\int_0^{\theta_c}\left[\frac{1}{\gamma} + 1/2\pi\left(1 - \left(1 - \frac{1}{n^2}\right)^{(1/\gamma+1)/2}\right)\right](\cos\theta)^{1/\gamma}\sin\theta\,d\theta\,d\phi = 1. \quad (17)$$

Figure 5:
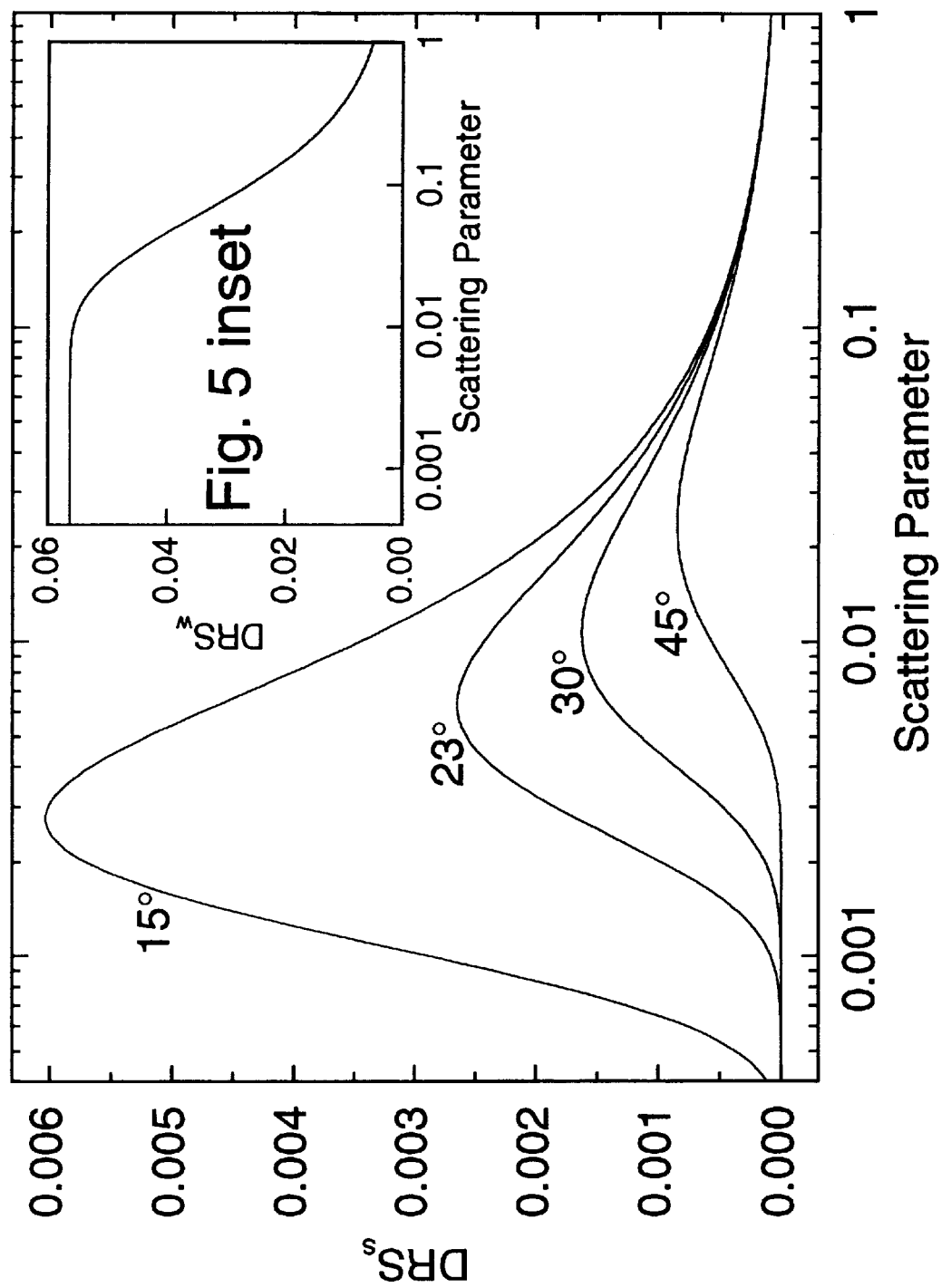
FIG. 5. The intensity of the diffuse reflectance signal ($DRS_S$) at the inflection point for four angular positions of detection, namely 15°, 23°, 30°, and 45°, where the solid angle of detection is 0.005 sr. The total diffuse reflectance signal ($DRS_W$) at the inflection point is shown in the inset.

Eq. 16 ($DRS_s$) as a function of the scattering parameter is plotted in FIG. 5 for angular positions of detection at 15°, 23°, 30°, and 45°, where the solid angle of detection is $\Omega_o = 0.005$ sr. The total angle integrated signal, $DRS_w$, as a function of scattering parameter is shown in the inset. The intensity shown is the fraction of the incident light detected at the point of inflection of the spectrum. The magnitude of the signal is independent of the angular position of the detector for Lambertian scattering. However, for maximum signal the back surface texture should be tailored to the particular angle of the detector, with best overall performance at small angles and small scattering parameters.

The scattering parameter, $\gamma$, is a measure of the width of the scattering distribution. From Eq. 10 the scattering parameter is related to the half width at half maximum, $\Delta\theta$, by $\gamma \ln(2) = -\ln(\cos\Delta\theta) \cong \Delta\theta^2/2$; solving for $\Delta\theta$ the width of the scattering distribution is given by the following power law of the scattering parameter, $\Delta\theta \cong \sqrt{2\ln(2)}\sqrt{\gamma} \cong 67°\sqrt{\gamma}$.

Having established the fundamental relation between the band edge absorption coefficient, substrate thickness, and diffuse scattering, in Eq. 14, the sensitivity of band edge thermometry to variations in the substrate properties will now be determined. In this analysis the effects of substrate thickness, back surface texture, reflectivity, width of the absorption edge, and the residual absorption below the absorption edge are considered. Furthermore, this analysis is achieved by modeling the two prominent implementations of band edge thermometry: diffuse reflectance spectroscopy (DRS) and transmittance spectroscopy (TS). The point of inflection and the position of the knee of the spectrum are considered as the spectral signatures (or critical points) that are related to substrate temperature. These two features are essentially given by the maximums of the first and second derivatives of the spectrum.

In this analysis each ray that exits the wafer is considered. The first or fundamental ray has the shortest path length in the substrate and each subsequent ray has a path length that increases with each additional reflection inside the substrate. Each ray has an unique spectrum and hence an unique energy at each critical point; as the path length of each subsequent ray increases the critical points shift to lower energies. The fundamental ray has the highest intensity while the intensity of each subsequent ray decreases with each additional reflection inside the substrate. The total spectrum is given by the sum or the spectra of the individual rays. Furthermore, in this analysis, the position of a critical point of the total spectrum is written in terms of the position of the critical point of the fundamental ray plus a correction term. This correction term describes the effect on the total spectrum from the shifted spectra of the higher order rays.

Effects of the Optical Measurement Configuration on the Band Edge Spectrum

Four different optical measurement configurations are considered in this analysis:

Configuration 1—Transmission of light incident on the back of the substrate, where $$TS_w = f_e(1-R)^2 \exp(-\alpha d)[1+y_s+y_s^2+\ldots]. \tag{18}$$

This represents the case where the light source is placed behind the substrate in the vicinity of the substrate heater. This is simple transmission.

Configuration 2—Transmission of heater or diffuser plate radiation through the back of the substrate, where $$TS_p = TS_w[1+R_p r_b+(R_p r_b)^2+\ldots]. \tag{19}$$

In this case the optical feedback between the radiation source and substrate is included. This is transmission with optical feedback from a diffuser plate.

Configuration 3—Diffuse reflection, of light incident on the front of the substrate, at the back of the substrate, where $$DRS_w = f_e(1-R)^2 \exp(-2\alpha d)[1+y_s+y_s^2+\ldots]. \tag{20}$$

This represents the case where the substrate heater is smooth and does not contribute to the diffuse scattering. This is diffuse reflection from a textured substrate.

Configuration 4—Diffuse reflection, of light incident on the front of the substrate, that is transmitted through the substrate, scattered at the diffuser plate, and transmitted back through the substrate, where $$DRS_p = DRS_w R_p(1-R)^2(1+f_e R^2 \exp(-2\alpha d)[1+y_s+\ldots])[1+R_p r_b+\ldots]. \tag{21}$$

In this case, the scattering of light as it passes through the back surface of the substrate is included. For simplicity, in these models $R_p$, $R_b$, and $R_b'$ are assumed to equal the normal incidence reflectivity R. This is diffuse reflection from a diifuser plate behind the substrate.

The rationale for the notation used in these models is as follows: DRS indicates a diffuse reflectance measurement and TS indicates a transmission measurement. The choice of subscripts originates in the diffuse reflectance model, where "w" stands for wafer and indicates the diffuse signal originates at the back of the substrate and "p" stands for pyrolitic-boron-nitride diffuser plate and indicates the diffuse signal originates at the diffuser plate. This notation is extended to the transmission models by noting the similarities between, $TS_w$ and $DRS_w$, and $TS_p$ and $DRS_p$.

The above models are written in the general form $$A_o f_e \exp(-a_o \alpha d) \sum_{m=0}^{\infty} S^m; \text{ with,} \tag{22}$$

$$S = f_e R^2(1+R_o)\exp(-2\alpha d) + f_r \exp(-2(1+\gamma)\alpha d),$$

where the constant $A_o$, $a_o$, and $R_o$ are listed in Table I below for each of the four models. Physically $A_o$ is the maximum intensity of the fundamental ray, $a_o$ is the path length of the fundamental ray in units of substrate thickness, and $R_o$ represents the enhancement of the signal through optical feedback between the back of the substrate and the reflector behind the substrate. $R_o$ is zero in the models where a reflector is not present behind the substrate. The enhancement of the signal from a reflector behind the substrate comes from the higher order rays. Therefore, $R_o$ is also a measure of the broadening of the total spectrum from the higher order rays that originate at the reflector behind the substrate. In the case where the substrate is GaAs and the diffuser plate is pyrolitic-boron-nitride the numerical values of the constants are given in brackets in Table I.

TABLE I

| Model | $A_o$ | $a_o$ | $R_o$ |
|---|---|---|---|
| $TS_w$ | $(1-R)^2$ | (.48) | 1 | 0 |
| $TS_p$ | $\dfrac{(1-R)^2}{1-R_p R}$ | (.58) | 1 | $\dfrac{R_p(1-R)^2}{R(1-R_p R)}$ (1.11) |
| $DRS_w$ | $R(1-R)^2$ | (.15) | 2 | 0 |
| $DRS_p$ | $\dfrac{R_p(1-R)^4}{1-R_p R}$ | (.16) | 2 | $1 + \dfrac{R_p(1-R)^2}{R(1-R_p R)}$ (2.11) |

The leading term in Eq. 22 is the fraction of the incident ray that exits as the fundamental ray. To a first approximation, this term relates the onset of transparency of the substrate to the absorption edge and the substrate thickness. The first term of S gives the correction due to multiple reflections in the substrate and the second term of S gives the correction due to light trapping in the substrate. The second term of S is zero when the back of the substrate is polished.

Critical Points in the Band Edge Spectrum

The knee and the point of inflection can be defined mathematically as critical points in the bandgap spectrum as discussed in the prior art. As a first step in achieving the objectives of this invention we show how the position of these critical points is related to the bandgap.

The spectral dependence of an exponential term in Eq. 22 is described by $f = \exp(-x)$; where $x = a\alpha d$ is a dimensionless variable, and a is the path length of the ray in units of substrate thickness. The point of inflection and the knee of the spectrum of an individual ray (or each term in Eq. 22) are defined by the zero crossings of the second and third derivatives of f, respectively. The first three derivatives of f in terms of x are:

$$f' = -x'f;$$

$$f'' = -x''f + x'^2 f;$$

$$f''' = -x'''f + 3x'x''f - x'^3 f. \quad (23)$$

In the case of direct bandgap materials the spectral dependence of the absorption coefficient, and hence x, is exponential; this type of a band edge is known as an Urbach edge. The Urbach model for absorption is $$\alpha(hv) = \alpha_g \exp\left(\frac{hv - E_g(T)}{E_o(T)}\right) + \alpha_o(T). \quad (24)$$

The term $\alpha_o(T)$ has been added to represent the slowly varying, temperature dependent absorption below the band edge. Here $\alpha(hv)$ is the absorption coefficient, hv is the photon energy, $E_o(T)$ is the inverse slope of the exponential absorption edge (sometimes called the Urbach parameter), $E_g(T)$ is the optical bandgap energy, and $\alpha_g$ is the bandgap absorption coefficient, which is 8000 cm$^{-1}$ for GaAs.

The position or energy of a critical point, $E_c$, has a corresponding absorption coefficient that is given by $\alpha_c = \alpha(E_c)$. By introducing a dimensionless parameter $a_c = \alpha_c d - \alpha_o d$ whose value depends on the critical point, the following relation between the energy of the critical point, the optical bandgap, and the Urbach parameter is obtained:

$$E_c(T) = E_g(T) - \ln\left(\frac{a \alpha_g d}{a_c}\right) E_o(T). \quad (25)$$

In order to determine $a_c$ for each of the two critical points, f" and f'" in Eq. 23 are set to zero. The derivatives of x with respect to energy are, $$x' = \frac{x - a\alpha_o d}{E_o}; \quad x'' = \frac{x - a\alpha_o d}{E_o^2}; \quad x''' = \frac{x - a\alpha_o d}{E_o^3}. \quad (26)$$

Note that the numerators of the derivatives of x equal $a_c$ at a critical point. Substituting $a_c$ for the numerators of the derivatives of x and substituting the resulting equations into the equations for f"=0 and f'"=0, two equations are obtained, one for $a_c$ at the point of inflection and one $a_c$ at the knee. Solving for $a_c$: $a_c = 1$ at the point of inflection and $a_c = (3 + \sqrt{5})/2 = 2.62$ at the knee. The absorption coefficient at the critical points is $\alpha_c = a_c/ad + \alpha_o(T)$. The spectral positions of the inflection point and the knee for each ray depend on the optical bandgap energy, the bandgap absorption coefficient, the Urbach parameter, and the total path length of the ray inside the wafer. It is interesting to note that the critical points of an individual ray are independent of the subedge absorption, $\alpha_o(T)$, and the interface reflectivity, R. Also note that the knee is ln(2.62)$E_o$=0.96$E_o$ closer to the bandgap than the inflection point, for both transmittance and reflectance (see Eq. 25).

Recall that the total spectrum is made up of the sum of the spectra of the individual rays represented by the terms in Eq. 22. The positions of the critical points of total spectrum are assumed to be given by a weighted average of the positions of the critical points of individual rays, where the weighting is proportional to the intensity of the ray. In this approximation the position of the critical points of the total spectrum are, $$E_c(T) = E_g(T) - \left[\frac{\sum_{i=0}^{\infty} W_i \ln\left(\frac{a_i \alpha_g d}{a_c}\right)}{\sum_{i=0}^{\infty} W_i}\right] E_o(T), \quad (27)$$

where the $i^{th}$ ray has weight $W_i$ and path length $a_i$. A convenient value for $W_i$ is the intensity of the spectrum of the $i^{th}$ ray at the critical point;

$$W_i = \quad (28)$$

$$A_o f_e \exp(-a_c - a_i \alpha_o d) \frac{m! [f_e R^2 (1 + R_o)]^{(m(m+3)/2-i)} [f_t]^{(i-m(m+1)/2)}}{[i - m(m+1)/2]! [m(m+3)/2 - i]!};$$

$$a_i = a_o + 2(m + [i - m(m+1)/2]\gamma);$$

$$i \in (m(m+1)/2, m(m+3)/2); \quad m = 0,1,2,3, \ldots,$$

where there are m+1 rays for each order m in Eq. 22. In this case, Eq. 27 becomes $$E_c(T) = E_g(T) - \left[\ln\left(\frac{a_o \alpha_g d}{a_c}\right) + \Delta_c\right] E_o(T); \quad (29)$$

$$\Delta_c = [1 - f_e R^2 (1 + R_o) \exp(-2\alpha_o d) -$$

$$f_t \exp(-2(1+\gamma)\alpha_o d)] \sum_{m=1}^{\infty} M_m;$$

$$M_m = \sum_{j=0}^{m} \left\{ \frac{m!}{j!(m-j)!} [f_e R^2 (1 + ((R_o)])^{m-j} [f_t]^j \exp(-2(m + j\gamma)\alpha_o d) \times \ln\left(1 + \frac{2(m + j\gamma)}{a_o}\right) \right\}.$$

The position of a critical point of the total spectrum is given by the position of the critical point of the fundamental ray plus the shift $-\Delta_c E_o$, due to the contribution of the higher order rays to the overall spectrum. The correction term $\Delta_c$ depends on the scattering parameter, $\gamma$, the subedge absorption, $\alpha_o$, the wafer thickness, d, and the reflectivity, R. Also since $\Delta_c$ is independent of $a_c$ it takes on the same value at the inflection point and the knee. Since the path length of the fundamental ray, $a_o$, is half as long in transmission as in reflection, the critical points are about 0.7$E_o$ closer to the bandgap in transmission than in reflection.

The parameter $a_m$ relates $\Delta_c$ to the actual correction given in numerical simulations of the TS$_w$, TS$_p$, DRS$_w$, and DRS$_p$, models. $a_m$ is larger for the point of inflection than for the knee. The actual correction terms for the inflection point and the knee are respectively, $$\Delta_p = a_m \Delta_c \text{ with } a_m = 1.1 \pm 0.1;$$

$$\Delta_k = a_m \Delta_c \text{ with } a_m = 0.6 \pm 0.2, \quad (30)$$

where $a_m$ is an average over the TS$_w$, TS$_p$, DRS$_w$, and DRS$_p$, models for $\gamma$ equal 0.0, 0.1, 0.3, and 1.0 with $\alpha_o d$ equal 0.0 and 0.5.

Sensitivity of the Inferred Temperature to Changes in the Critical Points Caused by Variations in Substrate Characteristics and Measurement Configurations In this invention the position of a selected critical point is one of the factors that is used to determine the temperature of the substrate. First we note that the temperature dependence of the position of a critical path in the spectrum, using the more accurate correction in Eq. 30, is, $$E_c(T) = E_g(T) - \left[\ln\left(\frac{a_o \alpha_g d}{a_c}\right) + a_m \Delta_c(T)\right] E_o(T). \quad (31)$$

Where the temperature shift $\Delta T$ associated with a small shift $\Delta E_c$ in the critical point is found by differentiating Eq. 31 and solving for $\Delta T$:

$$\Delta kT = \frac{\Delta E_c}{\frac{dE_g(T)}{dkT} - \left[\ln\left(\frac{a_o \alpha_g d}{a_c}\right) + a_m \Delta_c(T)\right]\frac{dE_o(T)}{dkT} - a_m E_o(T)\frac{d\Delta_c(T)}{dkT}}. \quad (32)$$

The contribution of $a_o$, $a_c$, and $\Delta_c$ in Eq. 32 is small (particularly at higher temperatures) and the temperature dependence of the Urbach parameter is small. For temperatures above room temperature the bandgap and Urbach parameter of most direct bandgap materials such as GaAs and InP are linear in temperature with slopes $S_g$ and $S_o$. Therefore, above room temperature Eq. 32 is approximately $$\Delta kT \cong -\frac{1}{S_g}\left(1 - \frac{S_o}{S_g}\ln(\alpha_g d)\right)\Delta E_c. \quad (33)$$

From Eq. 31 the shift in the position of a critical point due to changes in the physical characteristics of the substrate is $$\Delta E_c = -E_o\left[\ln\left(1 + \frac{\Delta d}{d}\right) + a_m \frac{\partial \Delta_c}{\partial d}\Delta d + \ln\left(1 + \frac{\Delta a_o}{a_o}\right) + \right. \quad (34)$$
$$a_m \frac{\partial \Delta_c}{\partial a_o}\Delta a_o + a_m \frac{\partial \Delta_c}{\partial \gamma}\Delta \gamma + a_m \frac{\partial \Delta_c}{\partial \alpha_o}\Delta \alpha_o +$$
$$\left. a_m \frac{\partial \Delta_c}{\partial R_f}\Delta R_f\right] - \left[\ln\left(\frac{a_o \alpha_g d}{a_c}\right) + a_m \Delta_c\right]\Delta E_o + \left[\frac{\partial E_g}{\partial n_c} - \right.$$
$$\left.\left(\ln\left(\frac{a_o \alpha_g d}{a_c}\right) + a_m \Delta_c\right)\frac{\partial E_o}{\partial n_c} - a_m E_o \frac{\partial \Delta_c}{\partial \alpha_o}\frac{\partial \alpha_o}{\partial n_c}\right]\Delta n_c.$$

The temperature error associated with variations in the physical characteristics of the substrate from those of the calibration substrate, is determined by substitution of Eq. 34 into Eq. 33. From Eq. 33, the temperature error for a 500 $\mu$m thick semi-insulating GaAs substrate, is $\Delta T = -1.8$ °C./meV $\Delta E_C$. The temperature error, $\Delta T$, due to changes in the physical properties of GaAs substrates from those of a 500° C., 500 $\mu$m thick, semi-insulating GaAs reference substrate, are given in Table II below, where the reference spectrum is obtained in the DRS$_w$ configuration with a scattering parameter of 0.1. In this case $a_m$ is 0.61 for the knee and 1.12 for the inflection point. The Urbach parameter is 11.0 meV and the subedge absorption coefficient is 3 cm$^{-1}$ for semi-insulating GaAs at 500° C.

The first two columns of Table II give the ratio of the physical characteristics of the substrate in question to those of the reference substrate. Columns three and four list the contributions of the correction parameter to the temperature error as a percentage of the total error. Columns five and six list the temperature error caused by using the calibration curve for a 500 $\mu$m thick semi-insulating GaAs with scattering parameter 0.1 to determine the temperature of the substrate in question. Column five is the error using the inflection point and column six is the error using the knee, to extract temperature.

The first line of Table II is for a 100 $\mu$m thick substrate (instead of 500 $\mu$m); the temperature inferred from the spectrum is 26° C. cooler (at the inflection point) and 29° C. cooler (at the knee), then the real temperature of the substrate. The second line gives the error associated with 5% thickness variations between substrates, where the temperature deviation is around the sensitivity of the technique. The third line is for the case where substrate temperature is inferred from the transmission spectrum and the calibration curve is determined using reflection measurements. In these first three examples the contribution of $\Delta_c$ opposes the spectral shift in the fundamental ray decreasing the temperature error. This partial offset is smaller at the knee (as $a_m$ is smaller), hence the knee is slightly more sensitive than the inflection point to changes in substrate thickness or measurement technique. However, since these changes are well defined they can be corrected for or calibrated for.

TABLE II

| Physical Characteristic | | Contribution of $\Delta_c$ | | Temperature Error | |
|---|---|---|---|---|---|
| Parameter | Value | % of $\Delta T_p$ | % of $\Delta T_k$ | $\Delta T_p$ (° C.) | $\Delta T_k$ (° C.) |
| d'/d | 0.2 | −22 | −11 | −26 | −29 |
| d'/d | 1.05 | −36 | −17 | 0.71 | 0.83 |
| a'$_o$/a$_o$ | 0.5 | −58 | −25 | −8.7 | −11.0 |
| γ'/γ | 10 | 100 | 100 | 5.7 | 3.1 |
| γ'/γ | 0.8 | 100 | 100 | −1.5 | −0.9 |
| γ'/γ | 0.1 | 100 | 100 | −9.6 | −5.2 |
| α'$_o$/α$_o$ | 1.5 | 100 | 100 | −2.2 | −1.2 |
| R'$_f$/R$_f$ | 0.8 | 100 | 100 | −0.16 | −0.09 |
| E'$_o$/E$_o$ | 1.2 | 8 | 5 | 29 | 24 |
| SI/n+ | 1.0 | −28 | −21 | 24 | 18 |

The remaining substrate characteristics listed in Table II above are more difficult to determine. The temperature errors for variations in the back surface texture of the substrate (or scattering parameter) are shown for γ'/γ=10 where the scattering is increased to that of a Lambertian scatterer, for γ'/γ=0.8 where the scattering is decreased by 20%, and for γ'/γ=0.1 where the scattering is decreased by a factor of ten. These results show that small changes in the scattering at the back surface cause errors around the sensitivity of the measurement, while large changes in scattering need to be corrected or calibrated for. The effect of increasing the subedge absorption is also shown. This represents the case where additional impurities in the substrate cause the residual subedge absorption to increase.

During deposition the reflectivity of the front surface of the substrate changes as the alloy type and composition of the deposited layer changes. The reflectivity change shown in Table II above is for a case where the index of refraction of the epilayer is 3.0 compared to 3.5 for the substrate, this depicts the deposition of high Al content AlGaAs on GaAs. Clearly variations in surface reflectivity have a negligible effect on the absolute accuracy of these temperature measuring techniques. If a large amount of impurities are present in the substrate (such as compensation doped material) the absorption edge will be broader; this case is represented by a 20% increase in the Urbach parameter. The errors listed for this case are determined assuming no impurity shift in the optical bandgap. Broadening of the edge by 20% causes an over estimation of the substrate temperature by 29° C. using the point of inflection and 24° C. using the knee. Finally in the event one uses a semi-insulating GaAs calibration curve for n+ GaAs substrates (last row in Table II), the temperature is over-estimated by 24° C. using the inflection point and 18° C. using the knee.

The shift in the inflection point is larger than the shift in the knee for variations in the back surface texture, subedge absorption, and front surface reflectivity, because it is more sensitive to variations in the correction parameter, $\Delta_c$. The knee is less sensitive than the inflection point to changes in the width of the absorption edge and doping levels because it is closer to the bandgap. Therefore the position of the knee is a more suitable reference point for temperature than the point of inflection.

Spectral Variations in the Throughput of the Optical Detection System

Another thing that affects the position of the critical points of the spectrum is variations in the optical response of the optical detection system. Since the optical response and the signal f are multiplicative, the higher order terms in the spectral dependence of the optical throughput appear with subsequently higher orders of the Urbach parameter at the critical points. This is because each higher order term of the optical throughput appears with a subsequently lower derivative in f at a critical point. These higher order terms can be neglected when there are no sharp kinks in the spectrum of the optical response. Therefore, only the contribution of the linear part of a slowly varying optical throughput has a significant effect on the position of a critical point.

When the optical response, g, has slope $1/E_s$, the functional form of the spectra are $$f \cdot g; \quad g = 1 + \frac{(h\nu - E_c)}{E_s}. \tag{35}$$

Where the position of the inflection point and the knee are given by $$f'' + 2(1/E_s)f' = 0$$

$$f''' + 3(1/E_s)f'' = 0. \tag{36}$$

Solving these equations, the shift in the critical point for slope $1/E_s$ in the optical response, to first order in $E_o/E_s$, is given by $$a'_c = a_c\left(1 + a_s \frac{E_o}{E_s}\right). \tag{37}$$

Where $a_s=2$ at the point of inflection and $a_s=0.8$ at the knee. Positive slopes in the optical response shift the critical points to higher energies while negative slopes shift them to lower energies. The point of inflection is 2.4 times more sensitive than the position of the knee to changes in the slope of the optical response. Typically $|E_s| \geq 0.33$ eV for optical response variations due to mirror and window coating during the deposition of GaAs based materials. However, when variations in the optical throughput are sharp, this analyses is not valid and the higher order terms in the optical throughput become important.

The shifts in the critical points of spectrum due to variations in the optical throughput, for $E_s = -0.33$ eV, result in a temperature error of 1.3° C. at the point of inflection and 0.5° C. at the knee, for the substrate discussed in Table II above.

Up to now the analysis is done for spectra plotted in terms of energy, which is the most convenient way to relate the critical points of the spectrum to the physical properties of the substrate. However, since transmittance and diffuse reflectance spectra are commonly measured in terms of wavelength, the shift in the position of the critical points, to first order in the Urbach parameter, is also determined for a spectrum plotted in terms of wavelength.

The positions of the critical points of a spectrum (in terms of wavelength) are determined by differentiating x in terms of wavelength, $\lambda$, where $$x' = -\frac{hc}{E_o \lambda^2}(x - a\alpha_o d); \tag{38}$$

$$x'' = \left[\frac{2hc}{E_o \lambda^3} + \left(\frac{hc}{E_o \lambda^2}\right)^2\right](x - a\alpha_o d);$$

$$x''' = -\left[\frac{6hc}{E_o \lambda^4} + 3\frac{hc}{E_o \lambda^2}\frac{2hc}{E_o \lambda^3} + \left(\frac{hc}{E_o \lambda^2}\right)^3\right](x - a\alpha_o d).$$

Solving Eq. 23 at the critical points, where the derivatives of x are given in Eq. 38, and neglecting higher order terms in $E_o/E_g$, the energies of the critical points are given by $$a'_c = a_c\left(1 + a_\lambda \frac{E_o}{E_g}\right), \tag{39}$$

where $a_\lambda=2$ at the inflection point and $a_\lambda=1.7$ at the knee. Plotting the spectrum in terms of wavelength, shifts the critical points up in energy. If not corrected for, this shift introduces a temperature error of −0.37° C. at the point of inflection and −0.31° C. at the knee, for a substrate like the one discussed in Table II above.

Finally, the positions of the critical points of the spectrum in terms of energy and wavelength are given in the critical point equation in Eq. 40. Where $\Delta_c(T)$ (Eq. 29) is a function of $\gamma$, R, $a_o$, d, and $\alpha_o(T)$, and represents the shift in the critical point due to multiple reflections and light trapping.

$$E_c(T) = E_g(T) - \left[\ln\left(\frac{a_o \alpha_g d}{a_c}\right) + a_m \Delta_c(T) - a_s \frac{E_o(T)}{E_s}\right] E_0(T) \tag{40a}$$

$$\lambda_c(T) = \frac{hc}{E_g(T) - \left[\ln\left(\frac{a_o \alpha_g d}{a_c}\right) + a_m \Delta_c(T) - a_s \frac{E_o(T)}{E_s} - a_\lambda \frac{E_o(T)}{E_g(T)}\right] E_0(T)} \tag{40b}$$

The other parameters of Eq. 40 are listed in Table III below: the first row is the path length of the fundamental ray inside the substrate in units of the substrate thickness. The second row is the dimensionless parameter that describes the absorption at the critical point and is defined in the paragraph preceding Eq. 25. The third row is a numerically determined constant that scales the correction parameter to the actual shift in the position of the critical point. The fourth row is the constant that relates variations in the optical response to shifts in the position of a critical point. The last row is the constant that gives the shift in the critical point when the spectrum is plotted in terms wavelength.

TABLE III

| Parameter | Reflectance | | Transmittance | |
|---|---|---|---|---|
| | knee | point | knee | point |
| $a_o$ | 2 | 2 | 1 | 1 |
| $a_c$ | 2.62 | 1 | 2.62 | 1 |
| $a_m$ | 0.6 | 1.1 | 0.6 | 1.1 |
| $a_s$ | 0.8 | 2 | 0.8 | 2 |
| $a_\lambda$ | 1.7 | 2 | 1.7 | 2 |

The values of the absorption coefficient at the critical points can be obtained by setting hv in Eq. 24 equal to $E_o(T)$ in Eq. 40 and assuming that $E_o(T)$ is small compared to $E_s$. The result is:

$$\alpha_c(T) = \frac{a_c \exp(-a_m \Delta_c(T))}{a_o d} + \alpha_o(T). \tag{41}$$

Eq. 41 is obtained from Eq. 24 with hv replaced by $E_c(T)$ from Eq. 40.

Knee Position Correction Equations

Now we develop an equation that corrects the position of the knee for variations in the properties of the substrate and the measurement geometry, based on the principles of the present invention as described in the preceding mathematical analysis.

As a first step in correcting for the shift in the spectrum caused by variations in the properties of the substrate, the position of the knee $\lambda_k$ or $E_k$ and the width of the knee $\lambda_a$ or $E_a$, are related to the properties of the substrate. When the background is zero the exponential knee equations (Eq. 1a) become, $$y(hv) = m_2 E_a \ln\left(1 + \exp\left(\frac{E_k - hv}{E_a}\right)\right); \tag{42}$$

$$y(\lambda) = m_2 \lambda_a \ln\left(1 + \exp\left(\frac{\lambda - \lambda_k}{\lambda_a}\right)\right),$$

for spectra plotted in terms of energy or wavelength. Furthermore, at the knee $y = -2\ln 2 E_a y'$ in terms of energy and $y = 2\ln 2 \lambda_a y'$ in terms of wavelength, where y' is the derivative of the asymptotic function. Writing the total spectrum as a single ray $f = \exp(-x)$ with $f' = -x'f$, and writing the position of the knee of the total spectrum as the position of the knee of a single ray (see Eq. 25), $$E_k(T) = E_g(T) - \ln\left(\frac{a_o \alpha_g d}{a_k}\right) E_o(T); \tag{43}$$

$$a_k(hv) = a_c\left(1 + a_s \frac{E_o(T)}{E_s}\right) \exp(-a_m \Delta_c(T));$$

$$a_k(\lambda) = a_c\left(1 + a_s \frac{E_o(T)}{E_s}\right)$$

$$\left(1 + a_\lambda \frac{E_o(T)}{E_g(T)}\right) \exp(-a_m \Delta_c(T)),$$

where $a_k$ is determined by comparing Eq. 25 with Eq. 40. In the derivation of Eq. 43 we assume that $E_o(T) \ll E_s$. Furthermore at the knee, from Eqs. 25 and 26, $E_o x' = a_k(hv)$ and from Eqs. 25 and 38, $E_o x' = -hc\, a_k(\lambda)/\lambda_k^2$. Finally, the width of the knee is related to the Urbach parameter by equating the fitting function divided by its derivative to the spectrum divided by its derivative, at the knee:

$$2\ln 2 E_a = \frac{1}{x'} = \frac{E_o}{a_k(hv)}; \tag{44}$$

$$2\ln 2 \lambda_a = \frac{-1}{x'} = \frac{E_o \lambda^2}{hc\, a_k(\lambda)}.$$

Solving Eq. 44 for $a_k(hv)$ and substituting this solution into Eq. 43, the knee of the total spectrum is $$E_k(T) = E_g(T) - \left[\ln\left(\frac{a_o \alpha_g d}{a_c}\right) + \ln\left(\frac{2\ln 2 a_c E_a(T)}{E_o(T)}\right)\right] E_o(T). \tag{45}$$

This equation makes a connection between the position of the knee in the spectrum and the position of the knee for the fundamental ray alone, in terms of the width of the knee, $E_a$. The shift in the knee from multiple reflections and light trapping ($\Delta_c$) and the shift in the knee due to nonuniform optical throughput ($1/E_s$), are sensed through the width of the knee. This is explained as follows: when the position of the knee shifts $\Delta E$ toward lower (higher) energies, due to changes in $\Delta_c$ and $1/E_s$, the position of the point of inflection shifts about $2\Delta E$ toward lower (higher) energies, causing the width of the knee to broaden (narrow). Therefore the width of the knee is a measure of spurious shifts in the position of the knee.

Similarly, in terms of wavelength, the position of the knee of the total spectrum is written in terms of the position of the knee of the fundamental ray and the width of the knee of the total spectrum;

$$\lambda_k(T) = \frac{hc}{E_g(T) - \left[\ln\left(\frac{a_o \alpha_g d}{a_c}\right) + \ln\left(\frac{2\ln 2 a_c hc \lambda_a(T)}{E_o(T) \lambda_k^2(T)}\right)\right] E_0(T)}. \tag{46}$$

Consider the case where the position of the knee, $E_{k;cal}$ or $\lambda_{k;cal}$, and the width of the knee, $E_{a;cal}$ or $\lambda_{a;cal}$, are measured as a function of temperature for a given substrate in a calibration run. The position of the knee, $E_k$ or $\lambda_k$, and the width of the knee, $E_a$ or $\lambda_a$, for a different substrate of the same material with different thickness or texture, are related to the calibration values (with extended subscript "cal") as follows (see Eqs. 45 and 46):

$$E_k = E_{k;cal} + E_o \ln\left(\frac{E_{a;cal} a_{o;cal} d_{cal}}{E_a a_o d}\right); \tag{47}$$

$$\frac{hc}{\lambda_k} = \frac{hc}{\lambda_{k;cal}} + E_o \ln\left(\frac{\lambda_{a;cal} a_{o;cal} d_{cal}}{\lambda_a a_o d} \frac{\lambda_k^2}{\lambda_{k;cal}^2}\right).$$

This is the Knee Position Correction Equation. The temperature, T, of the substrate can be inferred from the calibration curve by iteratively solving Eq. 47 to find an $(E_{k;cal}(T), E_{a;cal}(T))$ pair that satisfies Eq. 47 for the measured values of $E_k$ and $E_a$.

Neglecting the higher order terms in $E_a$ or $\lambda_a$, in Eq. 47, the relationship between the positions of the knees of the measured and calibration substrates, is $$E_{k;cal} = E_k + E_o \ln\left(\frac{a_o d}{a_{o;cal} d_{cal}}\right) + 3.6[E_a - E_{a;cal}]; \quad (48)$$

$$\lambda_{k;cal} = \lambda_k - \frac{\lambda_{k;cal}^2 E_o}{hc} \ln\left(\frac{a_o d}{a_{o;cal} d_{cal}}\right) - 3.6[\lambda_a - \lambda_{a;cal}].$$

These expressions are the Linearized Knee Position Correction Equations, which can also be solved iteratively. The second term in Eq. 48 adjusts for shifts in the position of the knee caused by differences in the thickness of the reference calibration substrate relative to the measured substrate, and differences in the optical configuration used to determine the band edge of the reference and measured substrates. The third term in Eq. 48 adjusts for spurious shifts in the position of the knee, caused by: 1) thin film interference, 2) absorbing overlayers, 3) variations in light scattering at the back of the substrate, 4) higher order effects of the optical configuration used to determine the band edge, 5) time dependent variations in the signal from the band edge caused by substrate rotation, and 6) nonuniformities in the optical response of the energy or wavelength selective detection system. In these six cases the shift in the position of the knee toward lower (higher) energies is sensed through the increase (decrease) in the width of the knee and hence, corrected for.

The spectra from substrates may in some practical situations be complicated by the low resolution of the available band edge thermometry instruments. Artificial broadening of the spectra, reduces the ability of the third term of Eq. 48 to adjust for spurious shifts in the position of the knee. Therefore, in order to extend the correction term in Eq. 48 to instruments with less than ideal resolution, the adjustable multiplicative constant, $C_s$, is attached to the third term of Eq. 48 (see Eq. 49). $C_s=1$ in the ideal case and is increased to compensate for the reduction coupling between the width of the knee and the position of the knee when the instrument resolution is below the critical value needed to resolve the band edge of the substrate.

A further complication is that the calibrated width of the knee $E_{a;cal}$ on the right hand side of Eq. 48 is also a function of the calibrated knee position, $E_{k;cal}$. This means that in general Eq. 48 must be solved self-consistently for $E_{k;cal}$. However since $E_{a;cal}$ is an approximately linear function of $E_{k;cal}$ we can replace $E_{a;cal}$ by the linear function of $E_{k;cal}$ and obtain an explicit expression for the corrected knee position. This expression is derived next. Furthermore, $\lambda_{k;cal}^2 E_o/hc$, which is the wavelength analog of the Urbach parmeter, is approximately equal to $3.6\lambda_{a;cal}$. Both quantities are linear functions of $\lambda_{k;cal}$. $E_o$ and $3.6E_{a;cal}$ are approximately equal and are linear functions of $E_{k;cal}$, (see Eqs. 43 and 44).

$$E_{k;cal} = E_k + A_1(E_1 - E_k)\ln\left(\frac{a_o d}{a_{o;cal} d_{cal}}\right) + \quad (49)$$
$$C_s[3.6E_a - A_2(E_2 - E_k)];$$

$$\lambda_{k;cal} = \lambda_k - A_1(\lambda_k - \lambda_1)\ln\left(\frac{a_o d}{a_{o;cal} d_{cal}}\right) -$$
$$C_s[3.6\lambda_a - A_2(\lambda_k - \lambda_2)].$$

Eqs. 49 are the Explicit Linearized Knee Position Correction Equations for the energy and wavelength spectra. These equations can be solved directly for the calibration knee positions $E_{k;cal}, \lambda_{k;cal}$ without the need for an iterative solution. This equation provides a preferred embodiment for practical temperature measurements. In Eq. 49, $A_2$, $E_2$ and $\lambda_2$ are constants obtained from linear fits to temperature dependent calibration data. Note, to first order the subscripts "k;cal" and "k" are interchangeable on the right-hand side of Eq. 49. Simulations or measurements can be used to determine the optimal value for $C_s$ in a particular application, such as the measurement of temperature during the growth of absorbing overlayers.

Equations 47, 48 and 49 show how to determine the corrected knee positions from the measured knee positions. The corrected knee positions are equal to the calibrated knee positions at the measurement temperature. Thus one can determine the temperature by looking for the temperature at which the corrected knee position matches the calibrated knee position on a calibration curve.

Finally, substrate temperature as a function of $E_{k;cal}$ and $\lambda_{k;cal}$ is given by Eq. 50.

$$T = T_1 + T_2 E_{k;cal}$$
$$T = T_1 + T_2 \lambda_{k;cal} + T_3 \lambda_{k;cal}^2 \quad (50)$$

These equations give the substrate temperature in terms of the knee position as determined from the knee position correction equations (Eqs. 47, 48, 49). Higher order polynomial fits to the knee position may also be used. Since the energy shift in the bandgap is proportional to the phonon occupation which is typically linear in temperature for temperatures above room temperature (Johnson et al., J. Appl. Phys. 78, 5609 (1995) and Beaudoin et al., Mat. Res. Soc. Symp. Proc (1996)), a linear fit is usually sufficient for temperature versus the position of the knee in terms of energy. Likewise, in terms of wavelength a second order fit is usually sufficient. The parameters $T_1$, $T_2$, and $T_3$ are determined by these fits.

Effect of Spectral Resolution on Calibrations and Application to Absorbing Overlayers:

In this invention a calibration curve is a graph or mathematical expression describing the temperature dependence of the knee position or width of the knee measured on a reference sample with known characteristics. In a preferred method, calibration curves are measured with the substrate material held in a furnace with an independent means for measuring the substrate temperature such as a thermocouple. The temperature dependence of the bandgap can be used as an approximate calibration curve for the knee position. The temperature dependence of the bandgap is known for a wide variety of semiconductors.

Two examples are used to demonstrate the above calibration method: The first case is for high resolution measurements of the transmittance spectra (plotted in terms of energy), from a 350 $\mu$m thick InP substrate. In this case the spectral resolution of the instrument is 3 nm which is sufficient to resolve the band edge of InP. The second example is for 13 nm resolution measurements of the transmittance spectra (plotted in terms of wavelength), from a 350 $\mu$m thick InP substrate. This case represents the typical resolution found in commercial instruments, such as the DRS 1000 system manufactured by Thermionics Northwest, 231-B Otto St., Port Townsend, Wash. 98368.

Figure 6:
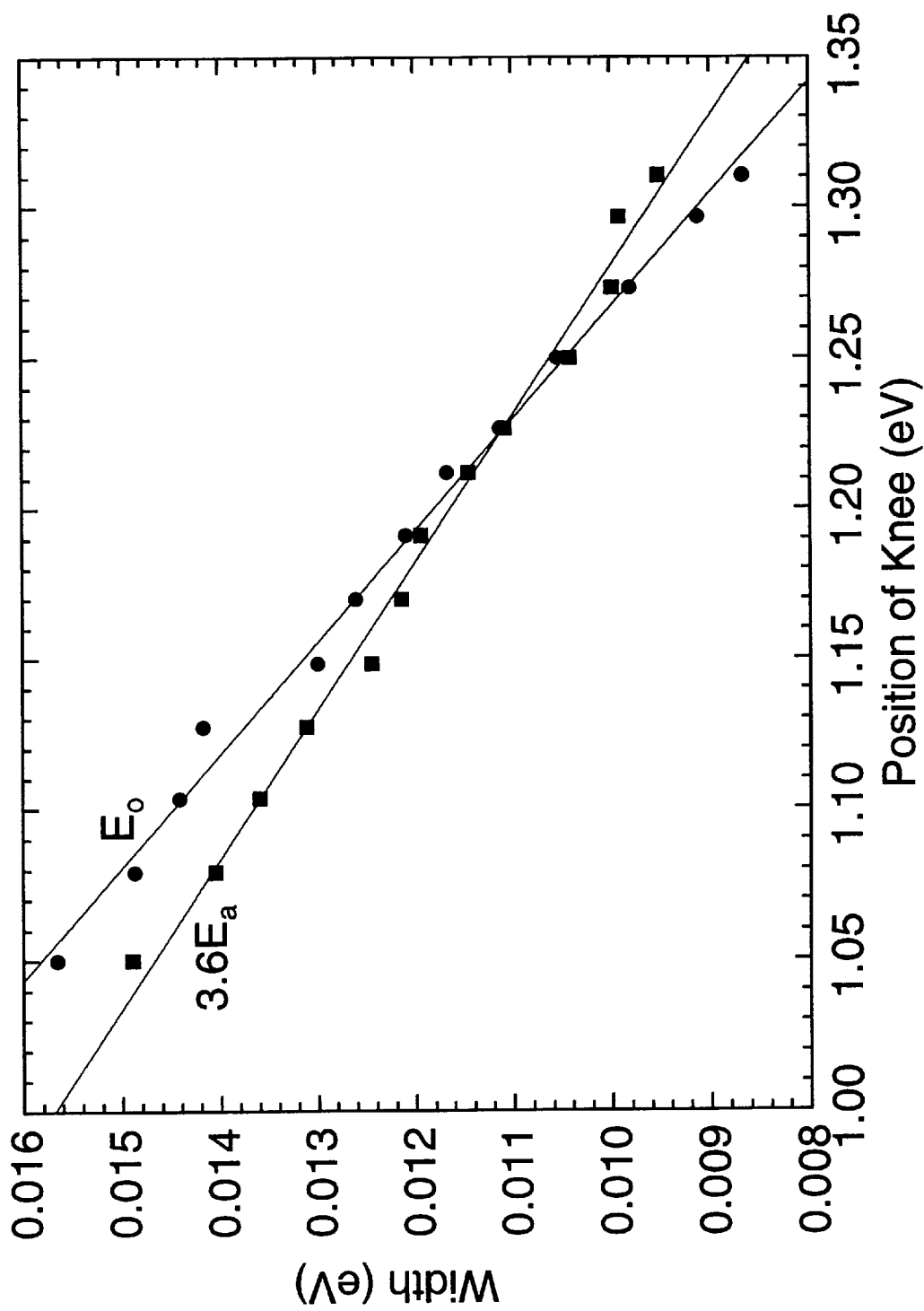
FIG. 6. The widths in energy of the band edge transmittance spectrum of InP as a function of the position of the knee of the spectrum. $E_a$ is the width of the knee as defined in Eq. 1 following and $E_o$ is the width of the Urbach slope.
Figure 7:
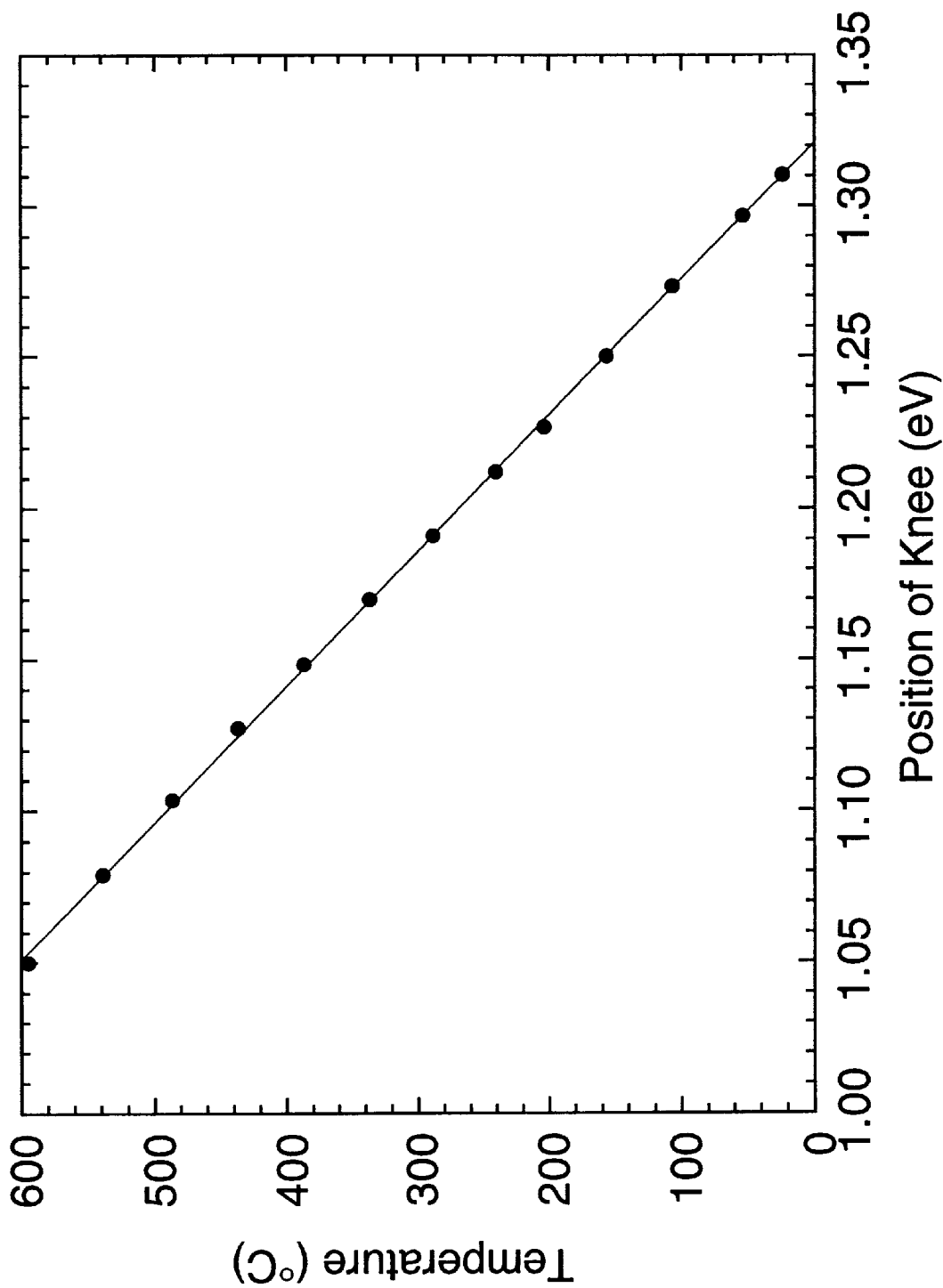
FIG. 7. The temperature of an InP substrate as a function of the position of the knee of the transmittance spectrum.

For the high resolution case a linear fit to $E_o$ and $3.6E_{a;cal}$ as a function of the position of the knee are shown in FIG. 6; the best fit parameters $A_1$, $E_1$, $A_2$, and $E_2$ are given in Table IV below. The calibration curve or substrate temperature as a function of the position of the knee, is shown in FIG. 7; the best (linear) fit parameters $T_1$ and $T_2$ are given in Table IV below.

TABLE IV

| Parameter | Value | Error |
|---|---|---|
| $d_{cal}$ | 350 μm | 10 μm |
| $A_1$ | 0.02682 | 0.00062 |
| $E_1$ | 1.640 eV | 0.011 eV |
| $A_2$ | 0.02027 | 0.00055 |
| $E_2$ | 1.774 eV | 0.016 eV |
| $C_S$ | 1.09 | — |
| $T_1$ | 2938.1° C. | 15.5° C. |
| $T_2$ | −2224.4 ° C./eV | 13.0° C./eV |

Figure 8:
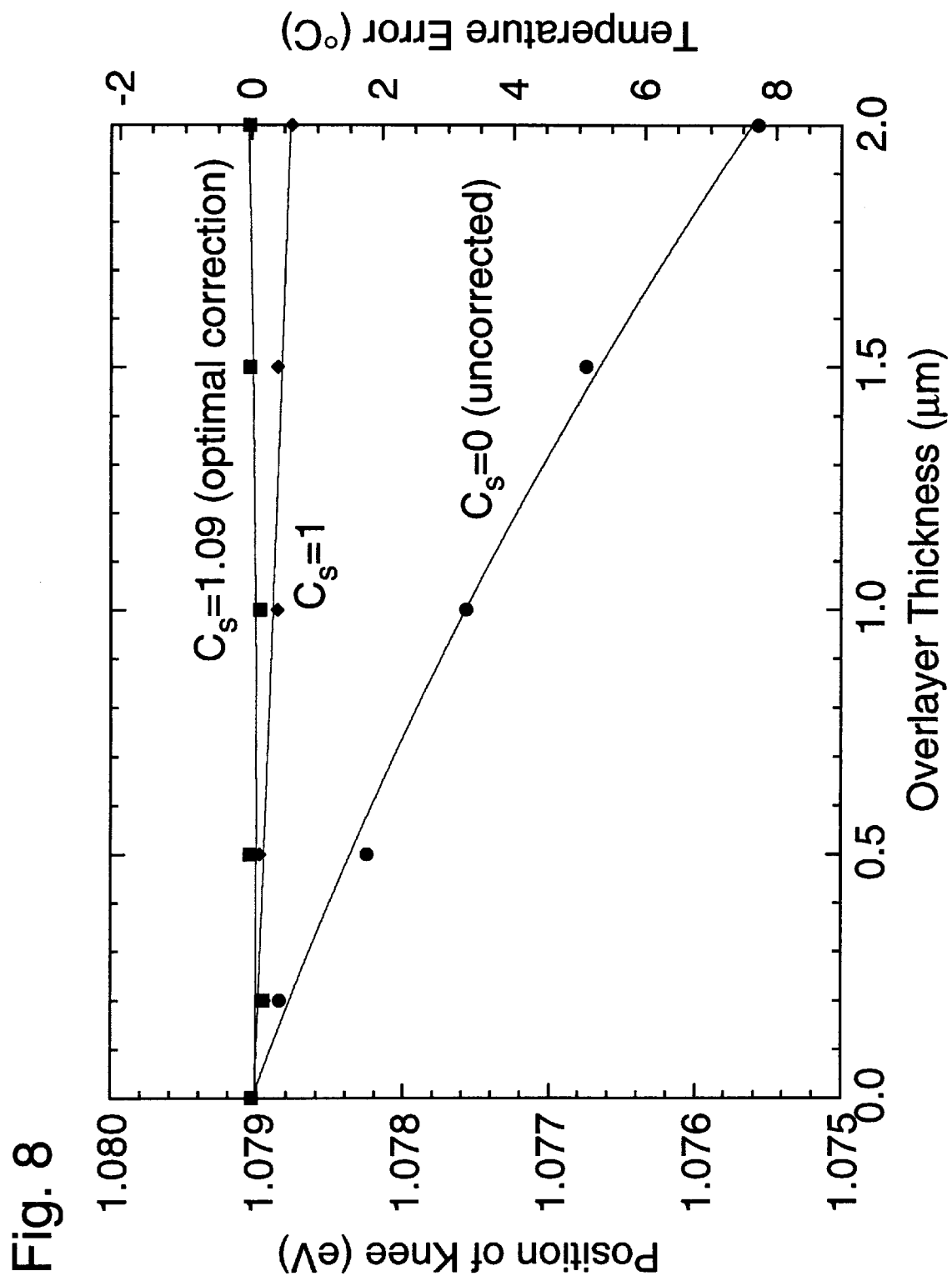
FIG. 8. The position of the knee of the transmittance spectrum of an InP substrate as a function of the thickness of the absorbing InGaAs overlayer. The adjusted position of the knee, using the width of the knee, is also shown. $C_s$ is a constant (defined in Eq. 49) that is determined from simulations of experimental data that is used to compensate for the effects of the limited spectral resolution of the detection system.

The effect of the growth of an InGaAs overlayer, at 539° C., lattice matched to an InP substrate is simulated by multiplying the transmittance spectrum from a bare InP substrate at 539° C. with the absorptance, $\exp(-\alpha_l t_l)$, of the InGaAs (53% In) layer. $t_l$ is the thickness of the layer and $\alpha_l$ is the absorption coefficient of InGaAs at 539° C. The InGaAs overlayer strongly absorbs in the vicinity of the band edge of the InP substrate; this additional absorption edge distorts the shape of the spectrum. As shown in FIG. 8, the position of the knee of the spectrum shifts to lower energies as the absorbing layer thickens. Also shown in the figure is the adjusted position of the knee given by Eq. 49, for $C_s \neq 1$ (the value predicted by the model) and for $C_s = 1.09$ (the optimal value). If not corrected, the temperature error for a 2 μm thick InGaAs layer is almost 8° C. The InGaAs layer becomes opaque for thicknesses greater than 2 μm and the InP substrate temperature is no longer measurable using band edge thermometry.

Figure 9:
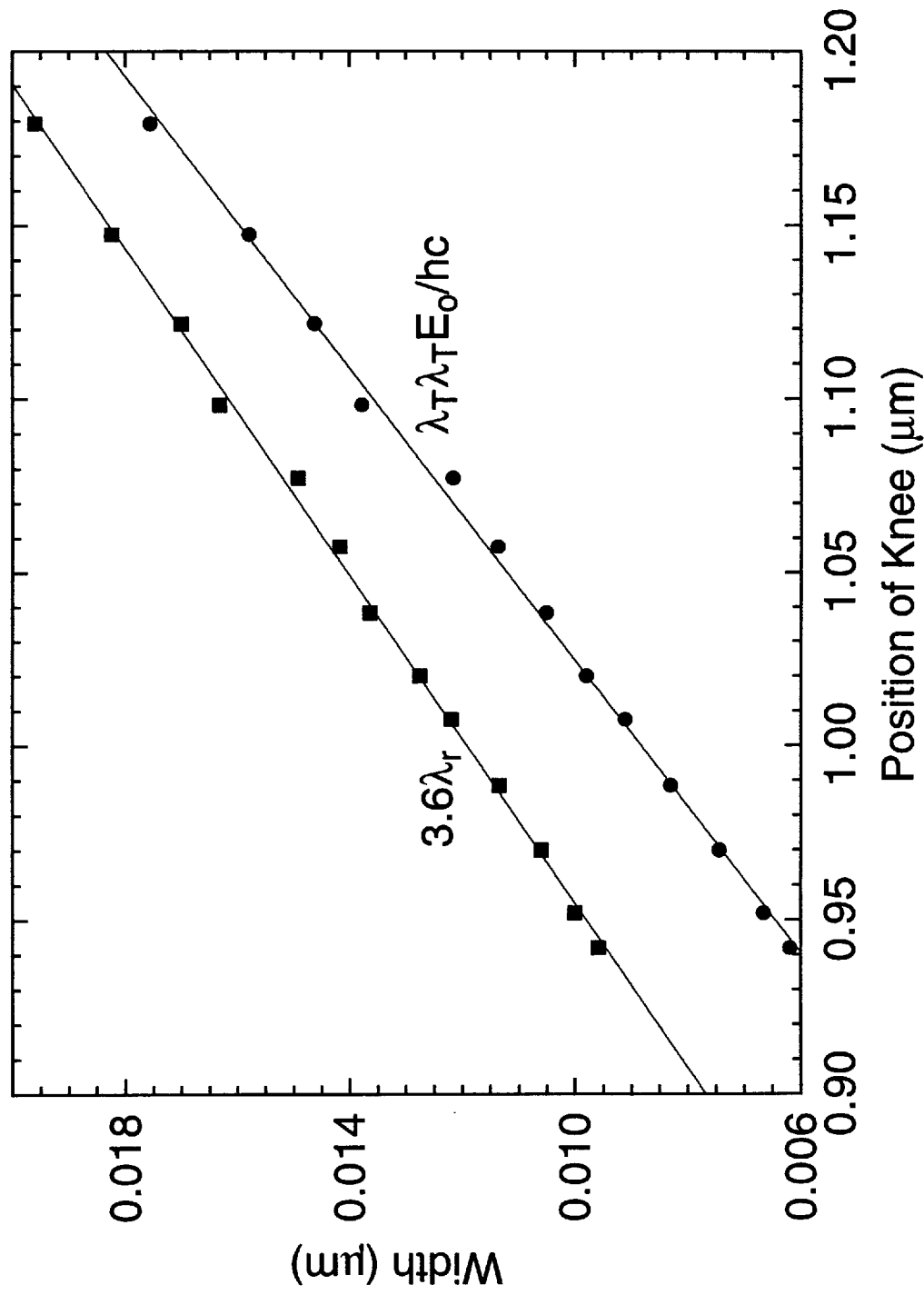
FIG. 9. The width (in wavelength measured in nanometers) of the band edge transmittance spectrum of InP as a function of the position of the knee of the spectrum. $\lambda_r$ and $\lambda_T$ in this figure are the same as $\lambda_{a;cal}$ and $\lambda_{k;cal}$ respectively in the description of the invention.
Figure 10:
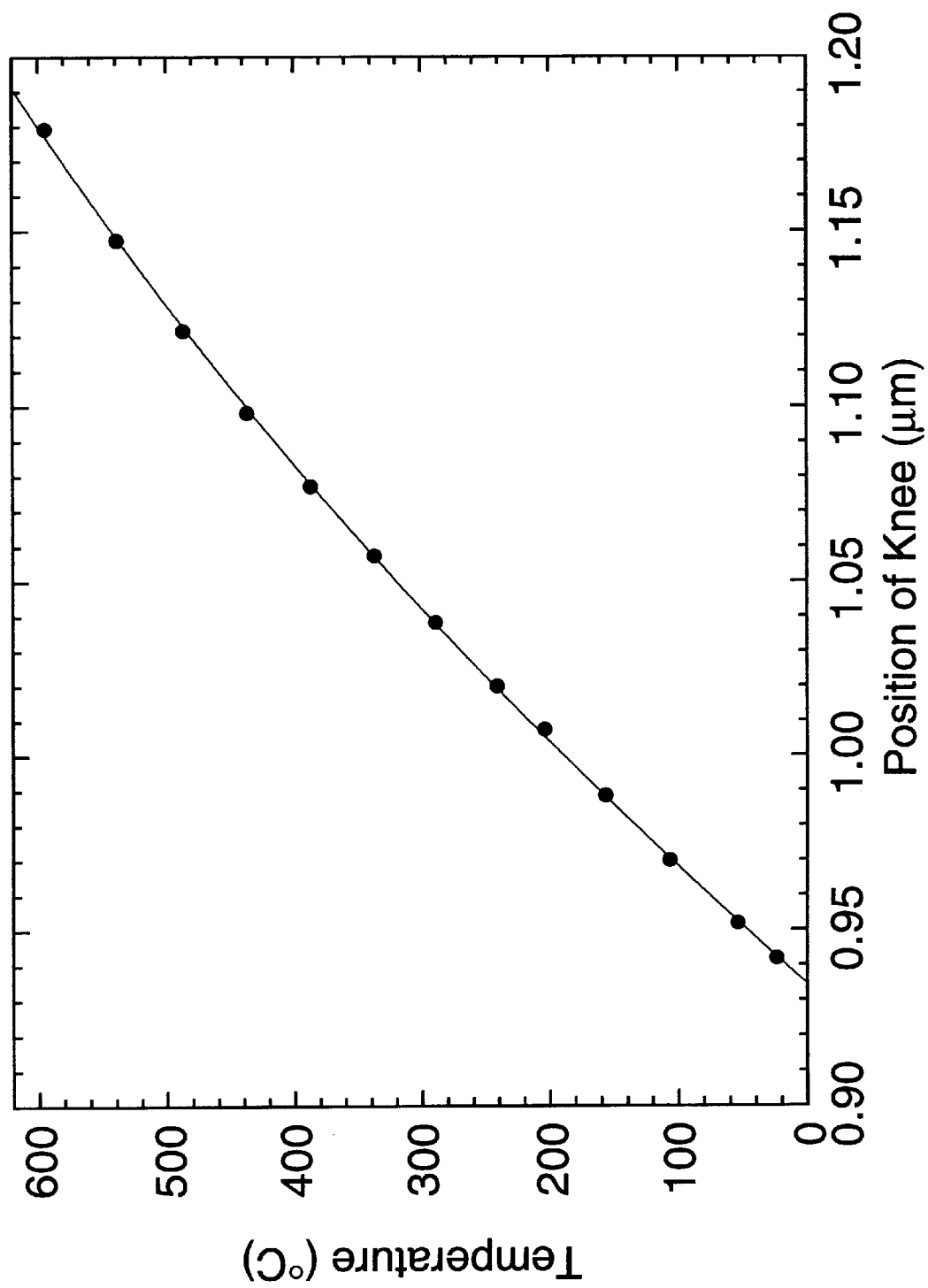
FIG. 10. The temperature of an InP substrate as a function of the position of the knee of the transmittance spectrum.

For the 13 nm resolution case, a fit linear fit to $\lambda_{k;cal}^2 E_o/hc$ and $3.6\lambda_{a;cal}$ as a function of the position of the knee are shown in FIG. 9; the best fit parameters $A_1$, $\lambda_1$, $A_2$, and $\lambda_2$ are given in Table V below. The calibration curve or substrate temperature as a function of the position of the knee, is shown in FIG. 10; the best fit parameters $T_1$, $T_2$, and $T_3$ are given in Table V below.

TABLE V

| Parameter | Value | Error |
|---|---|---|
| $d_{cal}$ | 350 μm | 10 μm |
| $A_1$ | 0.04755 | 0.00067 |
| $\lambda_1$ | 0.8141 μm | 0.0034 μm |
| $A_2$ | 0.04242 | 0.00055 |
| $\lambda_2$ | 0.7188 μm | 0.0043 μm |
| $C_S$ | 1.35 | — |
| $T_1$ | −5008.3° C. | 181.7° C. |
| $T_2$ | 7669.1° C./μm | 345.3° C./μm |
| $T_3$ | −2471.2° C./μm² | 163.5° C./μm² |

Figure 11:
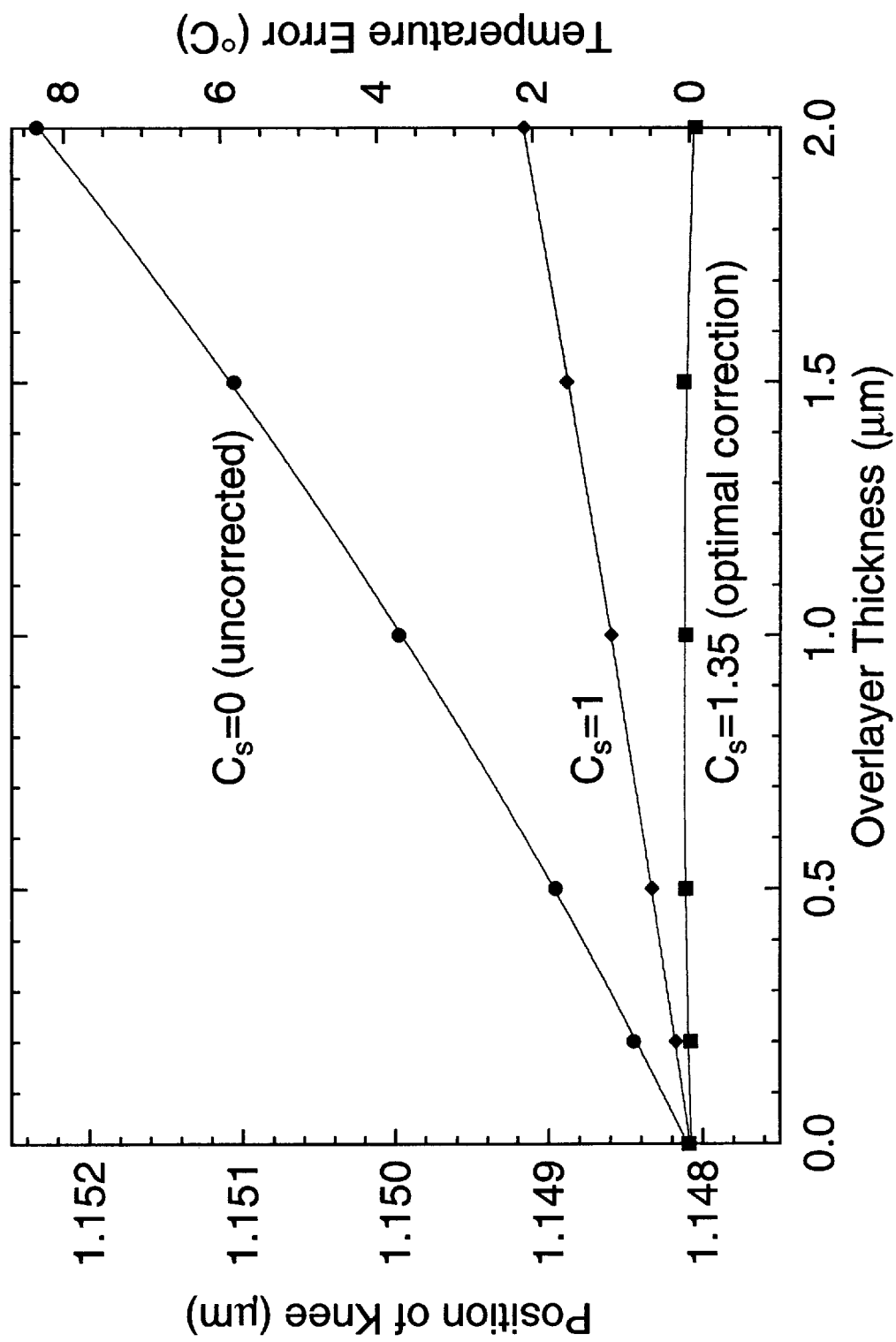
FIG. 11. The position of the knee of the transmittance spectrum of the InP substrate as a function of the thickness of the absorbing InGaAs overlayer. The adjusted position of the knee, using the width of the knee, is also shown. $C_s$ has the same definition as in FIG. 8.
Figure 12:
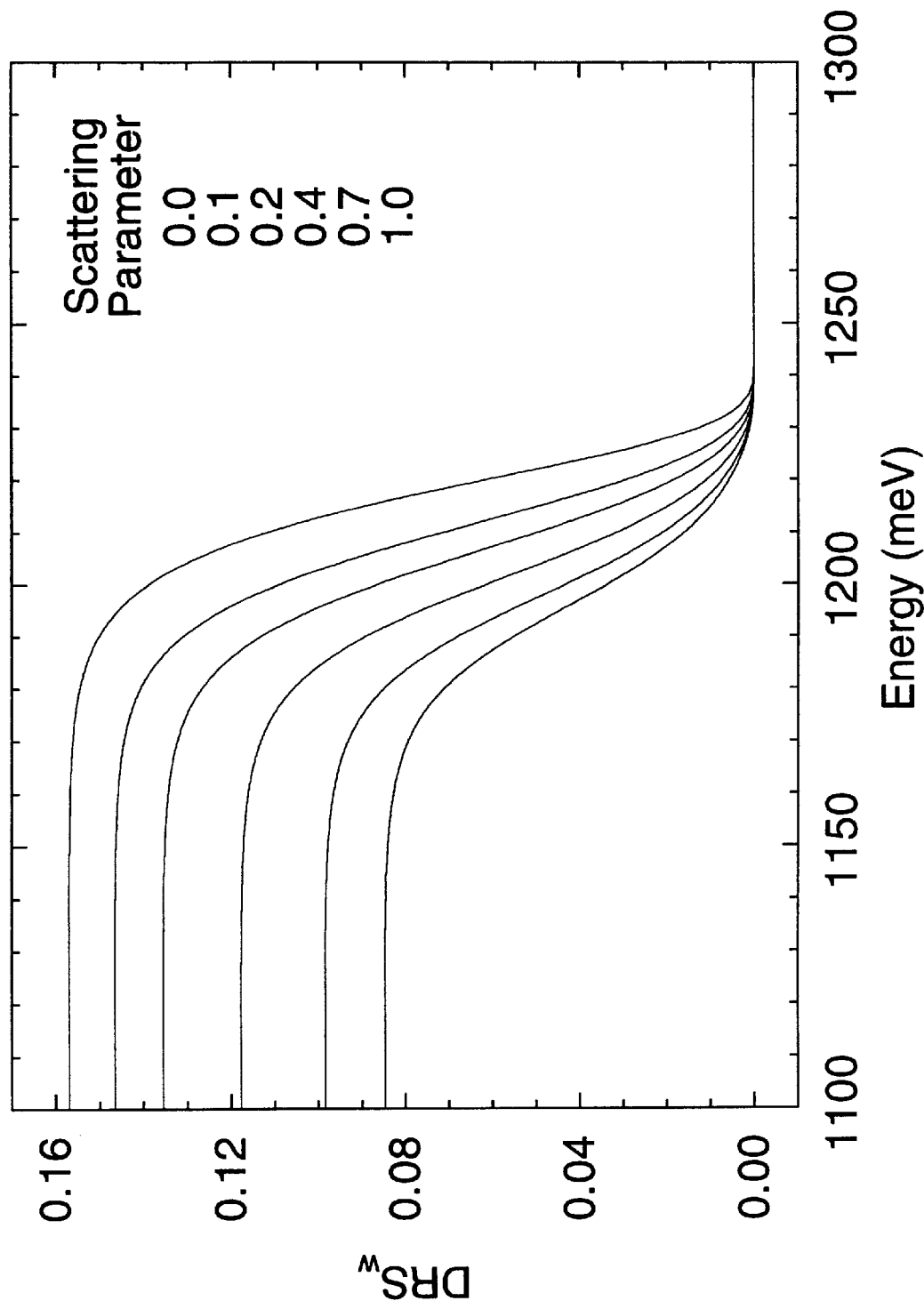
FIG. 12. Simulated diffuse reflectance spectra for a GaAs substrate at 332° C. for several values of the scattering parameter. As the scattering parameter increases the over all signal decreases.

Again, the effect of the growth of an InGaAs overlayer, at 539° C., lattice matched to an InP substrate is simulated by multiplying the broadened transmittance spectrum from a bare InP substrate at 539° C. with the absorptance spectrum of an InGaAs layer. As shown in FIG. 11, the knee shifts to longer wavelengths as the absorbing overlayer thickens. The adjusted position of the knee (Eq. 49) for $C_s = 1$ (the value predicted by the model) and for $C_s = 1.35$ (the optimal value), are also shown in FIG. 11. If not corrected, the temperature error for a 2 μm thick InGaAs layer is over 8° C., in this case. Correction for Variations in Scattering Characteristics of the Substrate A detailed analysis of the ability of Eq. 49 to correct for spurious shifts in the position of the knee caused by variations in scattering at the back of the substrate is now presented. In this simulation the scattering parameter is varied from zero to one for the diffuse reflectance spectrum from a 100 μm thick GaAs substrate at 332° C. This simulation is done using Eq. 14. In this case the absorption coefficient is given by Eq. 24, with $E_o = 9.73$ meV, $E_g = 1.271$ eV, and $\alpha_o = 1.78$ cm$^{-1}$. Some of these spectra are plotted in FIG. 12 for the scattering parameter values γ=0.0, 0.1, 0.2, 0.4, 0.7, and 1.0. As light scattering increases the knee broadens and the overall intensity of the spectrum decreases. These simulated spectra are for the high resolution case where the spectra are not artificially broadened by the energy selective detection system.

Figure 13:
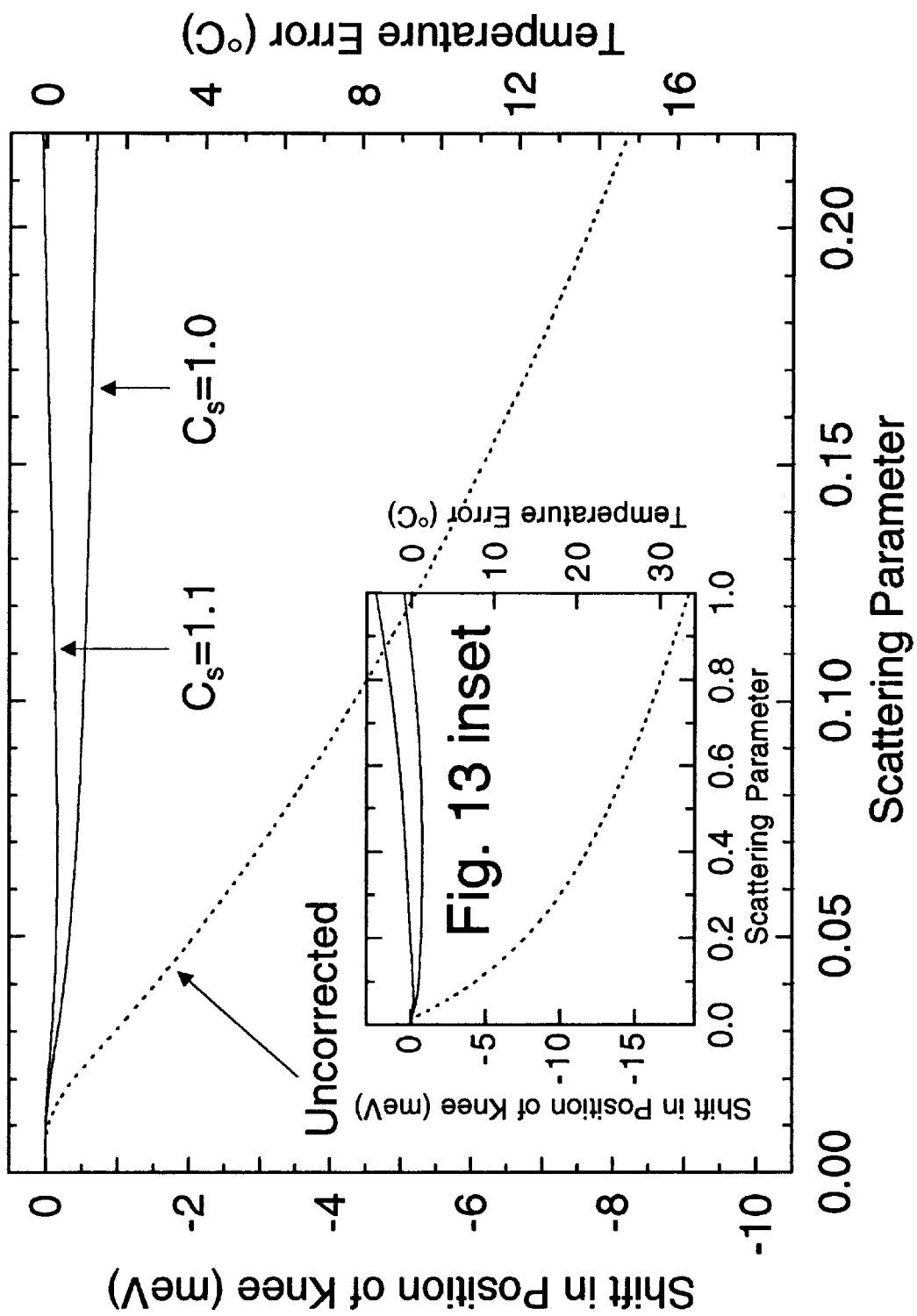
FIG. 13. The shift in the position of the knee (dashed line) with the scattering parameter and the associated temperature error. The adjusted position of the knee (solid line), using the width of the knee, is also shown. The limits of the plot are expanded in the FIG. 13 Inset.

In the following analysis the width of the knee is used to adjust for spurious shifts in the position of the knee caused by variations in back surface scattering. For the purpose of this demonstration Eq. 49 reduces to, $$E_{k;cal} = E_k + 3.6 C_s (E_a(\gamma) - E_a(0)) \quad (51)$$

where $E_k$ is the position and $E_a(\gamma)$ is the width of the knee of a spectrum with scattering parameter γ. $E_a(0)$ is the width of the knee of a spectrum from a substrate with a polished back. The shift in the position of the knee and the associated temperature error, are shown in FIG. 13, as a function of the scattering parameter over the range 0.0 to 0.22. This range covers the scattering from most textured wafers, see Table VI below. The full 0.0 to 1.0 range is shown in the FIG. 13 Inset. The dashed line gives the uncorrected shift in the position of the knee. The solid lines are the adjusted position of the knee (Eq. 51), for $C_s = 1.0$ and 1.1. The theoretical value, $C_s = 1.0$, appears to be the best choice over the total range of the scattering parameter, while $C_s = 1.1$ is the optimal value for the range of scattering parameters of interest (see Table VI below).

The room temperature (633 nm wavelength) scattering parameters for textured GaAs and InP substrates and some other common scatterers, are given in Table VI below. AXT (American Xtal Technology, 6780 Sierra Court, Suite I, Dublin, Calif. 94568) and LDP (Laser Diode Products, 205 Forrest Street, Metuchen, N.J. 08840) are substrate manufacturers.

TABLE VI

| Material | Treatment | Direction | Surface Color | γ |
|---|---|---|---|---|
| GaAs | as received AXT | [011] | metallic | 0.031 |
| GaAs | as received AXT | [01$\bar{1}$] | metallic | 0.009 |
| GaAs | HNO$_3$ etch | | dark gray | 0.31 |
| GaAs | HNO$_3$ etch | | light gray | 0.17 |
| GaAs | as received LDP | | metallic | 0.011 |
| InP | as received AXT | | gray | 0.13 |
| PBN | as received | | creamy | 0.22 |
| Paper | as received | | white | 0.37 |
| Spectralon | as received | | white | 0.27 |

The results in Table VI above show that the scattering parameter varies by over an order of magnitude for the textured surfaces considered. These results are not an exact measure of the scattering parameters for the longer wavelength light that is scattered off the texture surface from inside the wafer during band edge thermometry. Nevertheless they are good indicators of the variation one might expect in using different textured surfaces as diffuse scatterers. Furthermore in the case of semiconductor substrates, these results show that color is a good indication of the width of the scattering distribution; for example, when the backside of the wafer has a gray matte finish the scattering parameter is likely greater than 0.1 and the darker the finish the broader the scattering distribution. For scattering parameters below 0.03 the finish on the wafer appears metallic, like the surface of a polished wafer.

A better measure of the scattering parameter for infrared light incident on the textured back from inside the substrate during band edge measurements, is the scattering distribution of back scattered infrared light (incident on the front surface), that exits back out the front of the substrate. The problem with this type of measurement is that for broad scattering distributions only the first 16° of the peak of distribution escapes from the substrate. For broad distributions, measurements covering 16° are not wide enough to characterize the width of the distribution. Nevertheless, this technique works for narrow distributions such as the one given in row five of Table VI above.

In order to compare the scattering results for 633 nm laser light to those of infrared light, the scattering distribution of the GaAs wafer described in row five of the table above is measured using a normal incident (1046 nm) YLF infrared laser beam. At room temperature GaAs is transparent at 1046 nm. For 1046 nm laser light incident on the backside of the wafer the scattering parameter is about 30% smaller, at $\gamma=0.008$, than that for 633 nm laser light. A surface of a given roughness appears smoother to longer wavelength light, therefore one would expect the scattering parameter to decrease as the wavelength increases. It is also found that varying the intensity of the laser beam does not effect the width of the scattering distribution. For 1046 nm laser light incident on the polished front of the wafer, the width of the broadened scattering distribution outside of the wafer is given by $\gamma=0.15$. Correcting the broadened distribution, using Snell's law, the width of the scattering distribution inside the wafer is determined to be $\gamma=0.010$. The width of this scattering distribution, $\Delta\theta=7°$, is small and it is therefore not necessary to corrected for the angular dependence of transmission through the GaAs-air interface. The width of the scattering distribution inside the substrate for 1046 nm light is 10% smaller for than that for 633 nm light scattered from the back side for the substrate. Therefore, the scattering parameters given in Table VI above are a fairly good indicator of the scattering that occurs inside the substrate during band edge thermometry.

From the above results, it appears that for the purpose of temperature measurements: the substrate effectively has a polished back when $\gamma<0.01$ (or $\Delta\theta<7°$); while for textured substrates with a metallic finish ($0.01 \leq \gamma \leq 0.03$ or $7° \leq \Delta\theta \leq 12°$) the temperature errors are less than 2° C.; and for substrates with gray backs ($0.1 \leq \gamma \leq 0.3$ or $21° \leq \Delta\theta \leq 37°$) the temperature errors can be over 10° C., if not corrected.

Scattering from nitric acid etched GaAs is isotropic, making this surface well suited as a diffuse scatterer for temperature measurement during substrate rotation. Some of the back surface textures supplied by substrate manufacturers are slightly anisotropic. For example the scattering parameter for the back surface texture on the as received AXT GaAs wafers is about three times larger for the [011] direction than for the [01$\bar{1}$] direction (see Table VI above). When viewing this surface at 400× magnification under a Nomarski microscope, an ordered 20 μm by 10 μm pattern, in the [01$\bar{1}$] by [011] directions, is observed.

Figure 14:
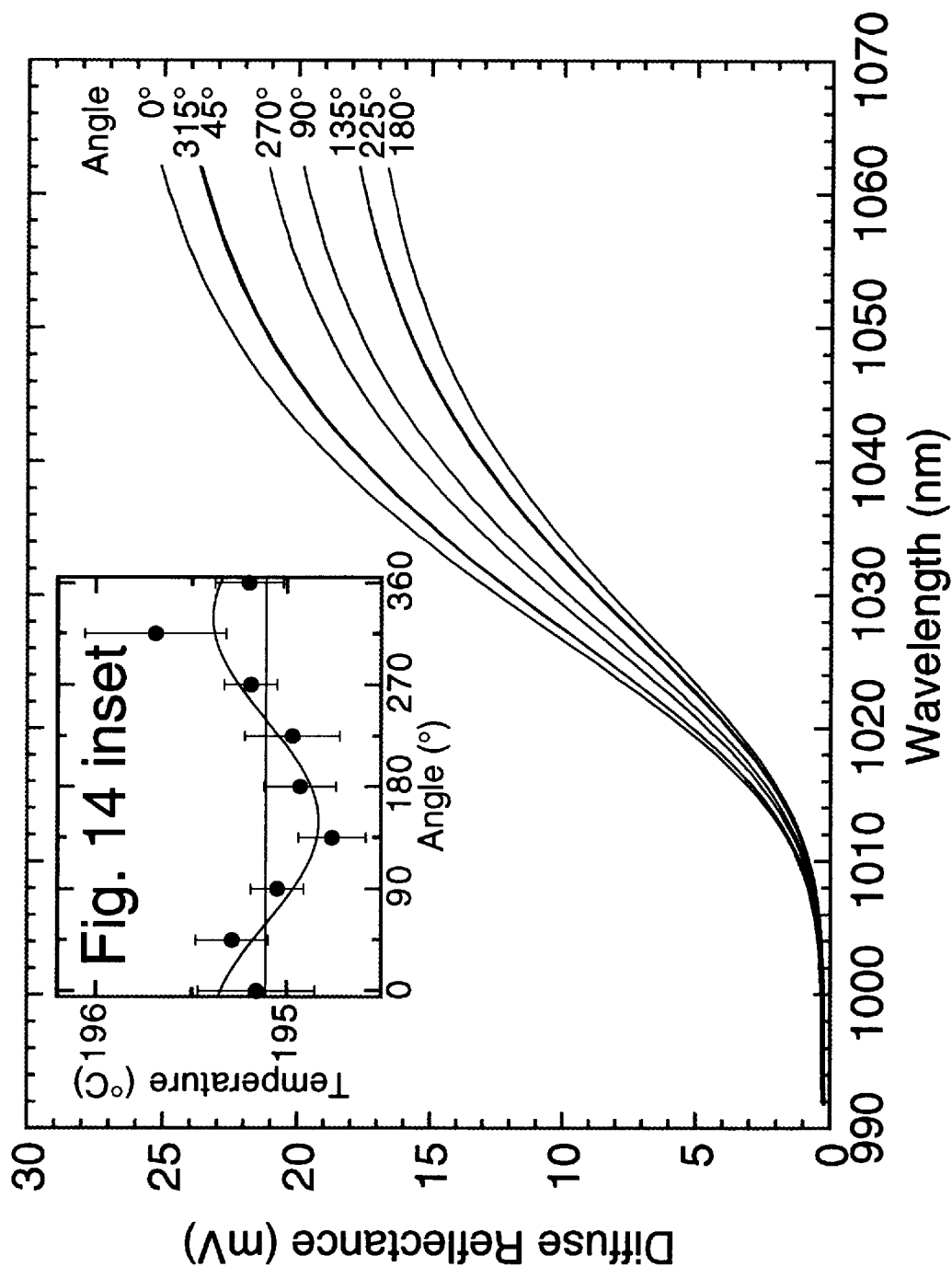
FIG. 14. The diffuse reflectance spectra from an InP substrate for different angular positions of a complete rotation of the substrate. The apparent temperature variation with angular position is shown in the inset.

When an anisotropic scatterer is rotated the intensity of the diffuse reflectance signal will oscillate at the frequency of the rotation. This time dependent signal can alter the shape of the spectrum and hence cause temperature errors that are similar to those caused by a wavelength dependent variation in the optical response of the band edge thermometer. Several diffuse reflectance spectra from an InP substrate with a textured back that is an anisotropic scatterer, are shown in FIG. 14. Each spectra is taken, while the substrate is stationary, at angular intervals of 45° over one complete revolution. The anisotropy of the scattering at the back of the wafer causes the magnitude of the diffuse reflectance signal to vary by about 40% during one full revolution.

The substrate heater power is held constant during these measurements, which for practical purposes holds the substrate temperature constant at 195° C. The apparent temperature variation over one rotation is shown in the FIG. 14 Inset. Several spectra are taken at each position with the mean temperature shown by the solid dot and the standard deviation shown by the error bar. Even though the variation in scattering intensity is large, the root mean square variation in the apparent temperature is less than 0.25° C., over one revolution.

However, during rotation the signal shifts from one curve to the next as the substrate moves from one angular position to the next. For example, when the substrate rotates at 30 rpm (2 s per revolution) and the monochromator scans the spectral region shown in FIG. 14 in 0.7 s, the angular position of the substrate changes at a rate of 120° per scan. This means the over all intensity can change by as much as 30% during one scan (see FIG. 14). These intensity changes distort the shape of the spectrum which in turn causes the position of the knee to fluctuate, the sign of the fluctuation depends whether the signal is increasing or decreasing and whether the monochromator is scanning toward short or long wavelengths. For example, when the monochromator is scanning toward longer wavelengths and the substrate is in the part of the rotation with increasing signal, the knee shifts to longer wavelengths causing the apparent temperature to increases. For the same scan during the opposite part of the rotation the apparent temperature decreases.

Figure 15:
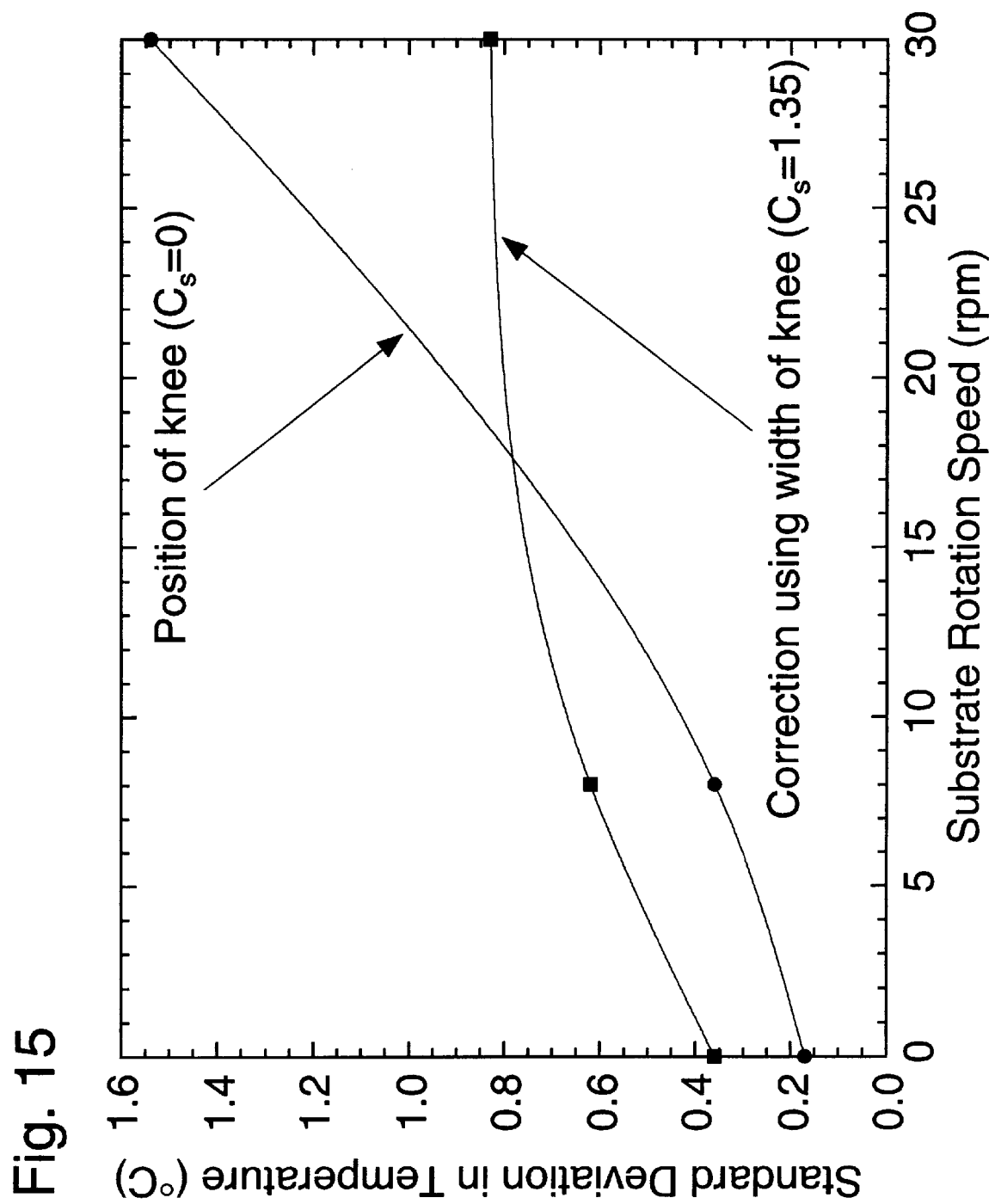
FIG. 15. The noise in substrate temperature measurement given by the position of the knee and the adjusted position of the knee using the width of the knee, for different substrate rotation speeds.

The result of these apparent temperature fluctuations is an increase in the noise of the measurement. This noise increases as the angular region of the substrate sampled per scan increases; this happens when either the substrate rotation rate is increased or the monochromator scan rate is decreased. The relation ship between rotation rate and the standard deviation in temperature is shown in FIG. 15, for 0.7 s spectrum acquisition times. When temperature is obtained from the position of the knee, the background noise level (at zero rotation speed) is less than 0.2° C. and the noise level increases to almost 1.6° C. at 30 rpm. These spurious shifts in the position of the knee are sensed through the width of the knee and hence, are partly offset when Eq. 49 is used. The noise in the temperature measurement using Eq. 49 is shown in FIG. 15, for the case where $C_s=1.35$. Eq. 49 decreases the noise by almost a factor of two, for a 30 rpm substrate rotation speed. This is another situation where using both the position and the width of the knee to obtain temperature is an improvement.

At low rotation speeds (see FIG. 15) the temperature noise level is larger when using both the position and the width of the knee to determine temperature. The additional noise comes from the higher background level (at zero rotation) when using an extra fitting parameter to determine temperature. Each parameter has a noise (or an error) associated with it; the error in the position of the knee and the error in the width of the knee are about the same size. Therefore adding the width parameter to the calculation roughly doubles the background noise level. Eq. 49 only effectively reduces the noise level at the higher rotation speeds, where the fluctuations in the position of the knee are substantial.

Band edge thermometry can be affected by thin film interference in a deposited layer that has a different index of refraction than the substrate. These interference fringes can play havoc with some algorithms that extract substrate temperature from the spectrum. Interference effects induce small changes in the shape of the spectrum which can cause the temperature reading inferred from the spectrum, to oscillate during growth.

Correction for Thin Film Interference Oscillations

Figure 16:
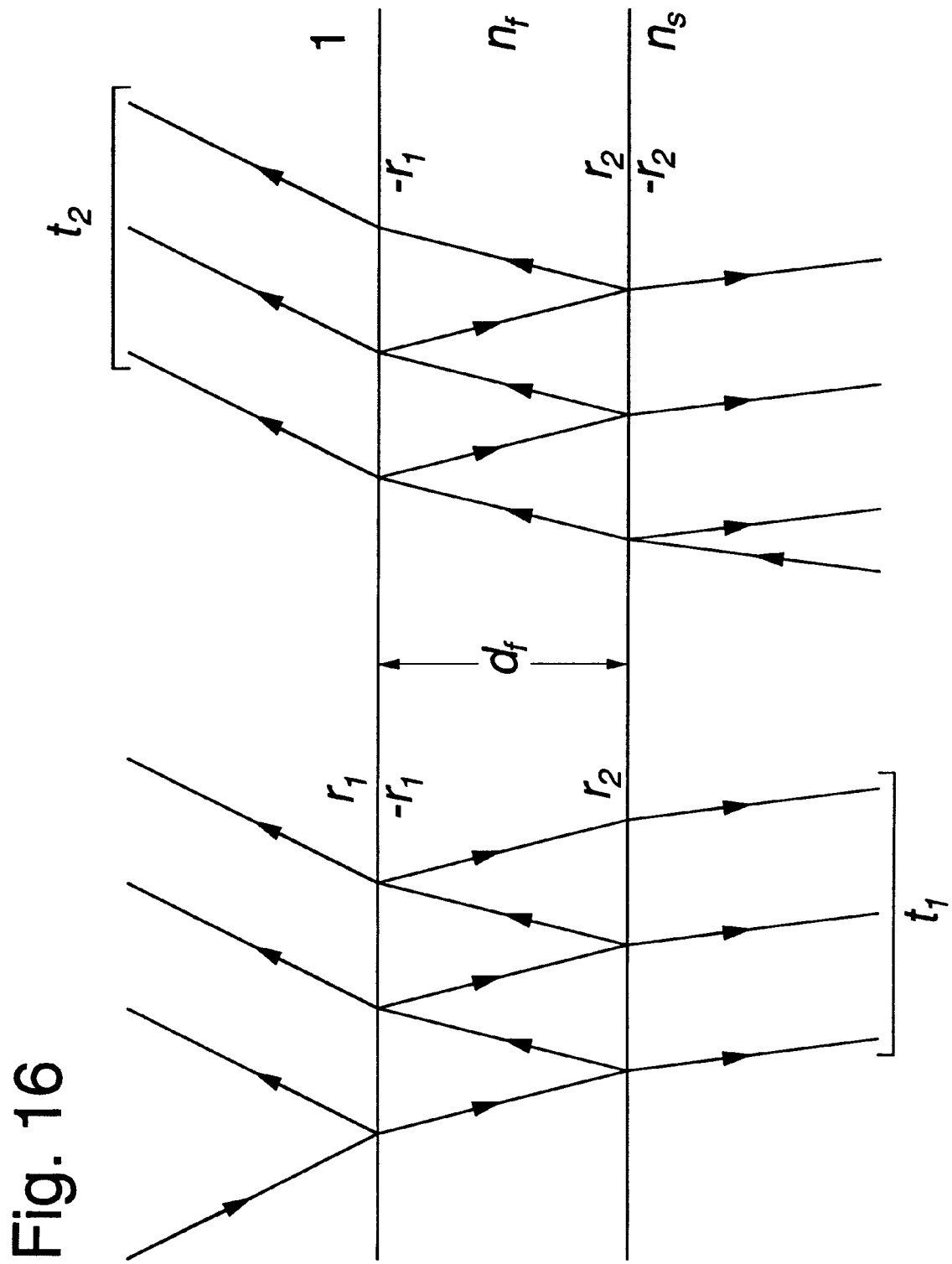
FIG. 16. Diagram showing the transmission of light through a layer with an index of refraction that differs from that of the underlying material.

For example, during the growth of AlGaAs on GaAs substrates, interference effects cause spectral dependent intensity oscillations in the band edge spectrum as it is transmitted through the AlGaAs overlayer. The index of refraction of the AlGaAs overlayer is lower than that of the GaAs substrate, partially reflecting the light as it travels through the interface. The partially reflected light wave interferes with the incident wave causing thin film interference in the layer. A ray diagram depicting multiple reflections in a deposited epilayer of thickness $d_f$, on a substrate, is shown in FIG. 16. In this figure $r_1$ and $r_2$ are the reflection coefficients for light at normal incidence to the vacuum-epilayer interface and the epilayer-substrate interface, respectively. The indices of refraction are, $n_f$ for the overlayer and $n_s$ for the substrate, with $n_f < n_s$. The complex amplitude for light transmitted through the overlayer is $t_1$ for light incident on the vacuum side of the layer, and $t_2$ for light incident on the substrate side of the layer:

$$t_1 = \frac{(1-r_1)(1-r_2)\exp(-i\delta/2)}{1+r_1 r_2 \exp(-i\delta)}; \quad (52)$$

$$r_1 = \frac{1-n_f}{1+n_f}; \quad r_2 = \frac{n_f - n_s}{n_f + n_s};$$

$$t_2 = \frac{(1+r_1)(1+r_2)\exp(-i\delta/2)}{1+r_1 r_2 \exp(-i\delta)};$$

$$\delta = \frac{4\pi n_f d_f}{\lambda} = \frac{4\pi n_f d_f}{hc} h\nu.$$

For band edge measurements done in reflection, the fundamental ray passes through the overlayer two times, once in each direction. Transmission of the fundamental ray including thin film interference in the overlayer is given by $$T_I = t_1 t_1^* t_2 t_2^* = \frac{(1-R_1)^2(1-R_2)^2}{\left(1+R_1 R_2 + 2\sqrt{R_1 R_2}\cos\delta\right)^2}. \quad (53)$$

The diffuse reflectance spectrum from a substrate during the growth of the overlayer is given by the product of $T_I$ and the spectrum from the substrate with no overlayer. This multiplicative term is analogous to the optical response of the system (see Eq. 35). The relationship between $T_I$, the optical response, g, and the slope of the optical throughput $1/E_s$ is $$g = \frac{T_I}{\langle T_I \rangle} \cong \frac{(1+R_1 R_2)^2}{\left(1+R_1 R_2 + 2\sqrt{R_1 R_2}\cos\delta\right)^2} \quad (54)$$

$$\cong 1 - 4\sqrt{R_1 R_2}\cos\delta;$$

$$\frac{1}{E_s} = g' = 4\delta'\sqrt{R_1 R_2}\sin\delta; \quad \delta' = \frac{4\pi n_f d_f}{hc}.$$

In this expression we have assumed that $R_1 R_2 \ll \sqrt{R_1 R_2}$. The interface reflectivities are $R_1 = r_1^2$ and $R_2 = r_2^2$ with $R_2 \ll 1$ and $$\sqrt{R_1} \equiv \frac{n_f - 1}{n_f + 1}; \quad \sqrt{R_2} \equiv \frac{\Delta n}{2n_f + \Delta n} \cong \frac{\Delta n}{2n_f}\left(1 - \frac{\Delta n}{2n_f}\right); \quad (55)$$

$$\Delta n = n_s - n_f > 0.$$

In this analysis, absorption in the overlayer is neglected because AlGaAs is transparent in the wavelength region of the onset of transparency of a GaAs substrate. Furthermore, interference effects are considered only for the fundamental ray. This approximation is valid for wavelengths in the vicinity of the onset of transparency of the substrate, where the contribution to the intensity from the higher order rays is small.

The period of the sinusoidal oscillation in the optical response decreases with layer thickness. This causes the position and the width of the knee to oscillate with an amplitude that increases as the layer thickens. The position and the width of the knee oscillate in phase when the spectrum is plotted in terms of wavelength, and out of phase when the spectrum is plotted in terms of energy: see for Example Eqs. 43 and 44. An analytical expression for the oscillations in the width of the knee is derived from Eqs. 43 and 44 and shown in Eq. 56. The amplitude of the oscillations increase with overlayer thickness, the Urbach parameter, and the difference in the index of refraction of the overlayer and the substrate.

$$\lambda_a = \bar{\lambda}_a\left(1 - a_s \frac{E_o}{E_s}\right) \quad (56)$$

$$\cong \bar{\lambda}_a\left(1 - \frac{8\pi a_s E_o \sqrt{R_1}}{hc}\Delta n\left(1 - \frac{\Delta n}{2n_f}\right)d_f \sin\delta\right);$$

$$\bar{\lambda}_a = \frac{E_o \lambda_k^2 \exp(a_m \Delta_c)}{A_m hc\left(1 + a_s \frac{E_o}{E_g}\right)} \cong \frac{E_o \lambda_k^2 (1 + a_m \Delta_c)}{A_m hc}.$$

Figure 17:
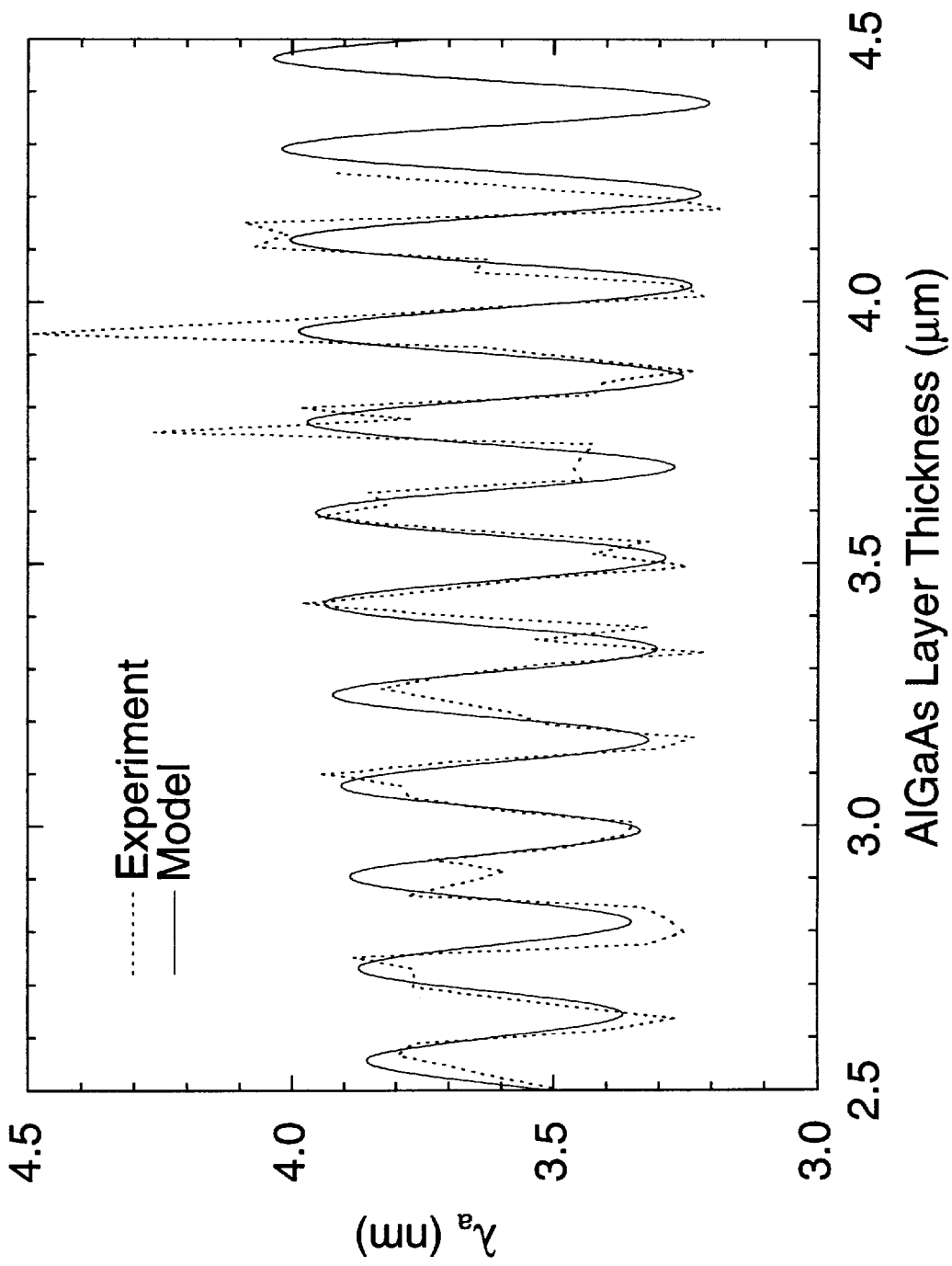
FIG. 17. Oscillations in the width of the knee during the growth of $Al_{0.5}Ga_{0.5}As$ on GaAs (dashed line). The solid line is a fit to the model.

These oscillations in the width of the knee are observed during the growth of a 4.2 μm thick $Al_{0.5}Ga_{0.5}As$ layer on a 450 μm thick semi-insulating GaAs substrate with a polished back surface. The substrate is rotated at 30 rpm during growth to improve the deposition uniformity. Variations in the layer thickness cause phase variations across the substrate which reduce the effects of thin film interference. The substrate heater is maintained at constant power to maintain a constant substrate temperature. The knee region of the diffuse reflectance spectrum is scanned, recorded, and fit to Eq. 1a, at intervals of about 1 min. The width of the knee, $\lambda_a$, as a function of layer thickness, from 2.5 μm to 4.2 μm, is shown in FIG. 17. The solid line in FIG. 17 is a fit to Eq. 56. The following best fit parameter values are obtained:

$$\bar{\lambda}_a = 3.62 \pm 0.02 \text{ nm}, \Rightarrow a_m \Delta_c = 0.080; \quad (57)$$

$$\frac{\lambda_k}{2n_f} = 0.1733 \pm 0.0001 \mu m, \Rightarrow n_f = 3.32;$$

$$\frac{8\pi a_s E_o \sqrt{R_1}}{hc}\Delta n\left(1 - \frac{\Delta n}{2n_f}\right) = 0.026 \pm 0.002 \; \mu m^{-1},$$

$$\Rightarrow \Delta n = 0.26.$$

From these values $R_1 = 0.288$, $R_2 = 0.0014$, and $n_s = 3.58$. The average substrate temperature during growth is 567.3° C. ($\lambda_k = 1150.4$ nm). The experimental value of $a_m \Delta_c = 0.080$ is in agreement with 0.070 given by the model.

Figure 18:
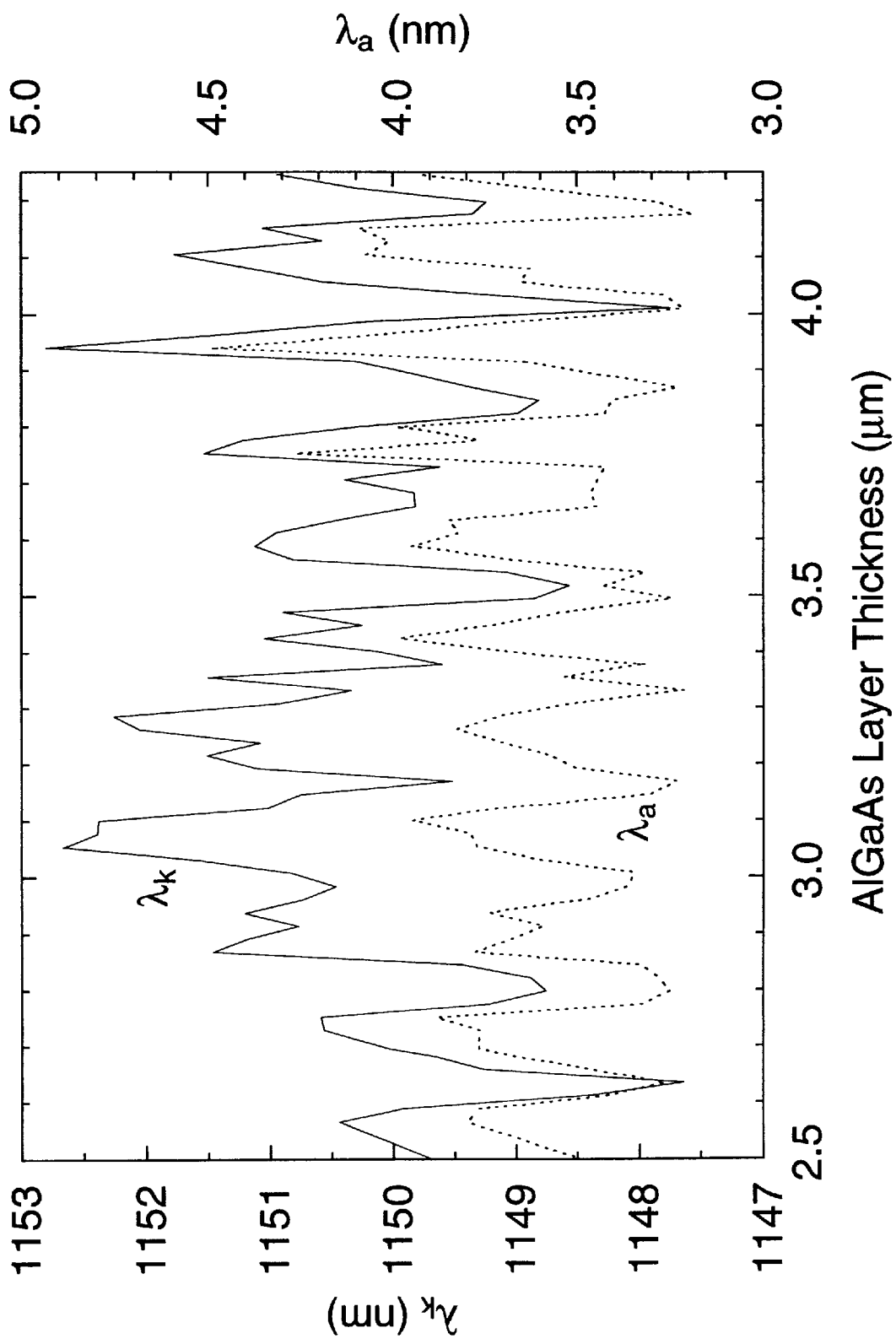
FIG. 18. The position of the knee ($\lambda_k$ solid line) and the width of the knee ($\lambda_a$ dashed line) during the growth of $Al_{0.5}Ga_{0.5}As$ on GaAs.

The position and the width of the knee, during the growth of AlGaAs on GaAs, are compared in FIG. 18. As predicted, the position and the width of the knee oscillate in phase. The position of the knee also exhibits larger period fluctuations due to small variations in the temperature of the substrate during growth. The width of the knee is insensitive to these small differences in temperature.

Figure 19:
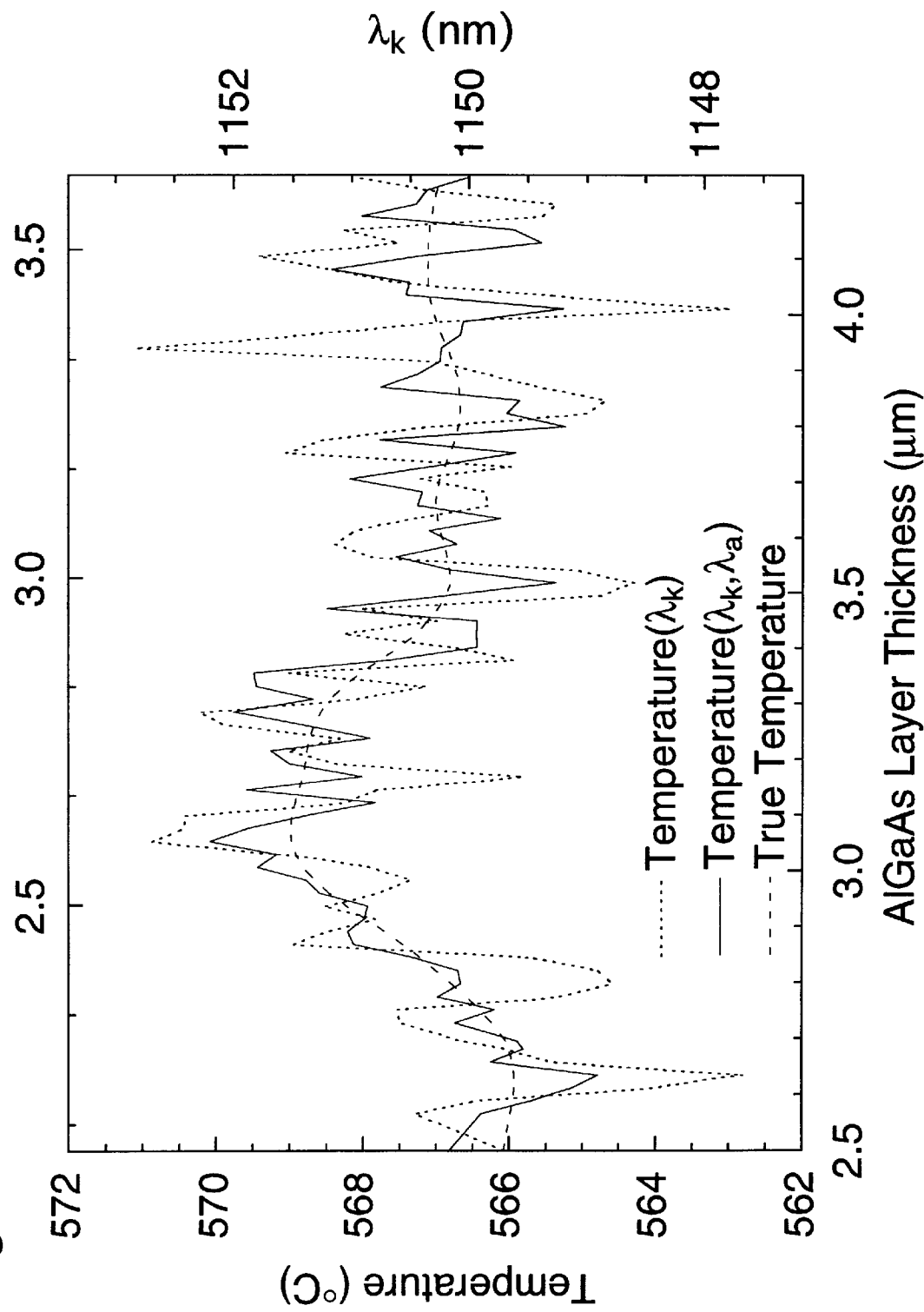
FIG. 19. Substrate temperature given by, the position of the knee (dashed line), the adjusted position of the knee (solid line), and the true temperature (broken line), during the growth of $Al_{0.5}Ga_{0.5}As$ on GaAs.

The data shown in FIG. 18 is used to determine the effectiveness of the algorithm described in Eq. 49. In this case the adjusted position of the knee is $$\lambda_{k;cal} = \lambda_k - C_s[3.6\lambda_a - 3.6\bar{\lambda}_a], \tag{58}$$

where $\lambda_k$ is the position and $\lambda_a$ is the width of the knee of the spectrum from the substrate during the growth of the AlGaAs overlayer. $\bar{\lambda}_a$ is the average width of the knee. The temperatures given by the measured position of the knee (dashed line) and adjusted position of the knee (solid line), are shown in FIG. 19. Also shown, is a smooth fit to the position of knee (broken line), which is assumed to represent the true temperature of the substrate. The root mean square temperature fluctuations about the true temperature are 1.5° C. for the measured knee and 0.7° C. for the adjusted knee. The correction algorithm reduces the fluctuations in the temperature to within a few tenths of a degree of the background noise (typically about 0.5° C.).

As is apparent to those skilled in the art, in the light of the foregoing disclosure, many alterations and modifications are possible in the practice of this invention without departing from the spirit or scope thereof. Accordingly, the scope of the invention is to be construed in accordance with the substrate defined by the following claims.

What is claimed is:

1. An optical method for measuring the temperature of a semiconductor substrate material in a process chamber comprising:

(a) emitting radiation from a light source thereby causing broad spectrum radiation to be incident upon the substrate;

(b) using a wavelength selective detection system to measure a band edge spectrum of the substrate;

(c) analyzing the band edge spectrum to determine a position of a knee of the spectrum;

(d) analyzing the band edge spectrum to determine a width of the knee of the spectrum;

(e) determining a corrected position of the knee of the spectrum using the width of the knee of the spectrum, and;

(f) computing the temperature of the substrate from the corrected position of the knee of the spectrum.

2. A method as claimed in claim 1 wherein the corrected position of the knee is determined by adding a term to the determined knee position, the term being proportional to the width of the knee, and the temperature is computed by comparing the corrected position of the knee to a calibration curve.

3. A method as claimed in claim 2 wherein the term proportional to the width of the knee is adjusted to correct for the effect on the determined knee position of the thin film interference oscillations caused by the growth of the thin film with a different index of refraction on the substrate.

4. A method as claimed in claim 3 wherein the substrate material is gallium arsenide and an interference oscillation pattern is due to the thin film of aluminum gallium arsenide deposited on the substrate.

5. A method as claimed in claim 2 wherein the term proportional to the width of the knee is adjusted to correct the determined knee position for the effect of a thin film of an optically absorbing semiconductor material which is deposited on the semiconductor substrate.

6. A method as claimed in claim 5 wherein the absorbing semiconductor material is indium gallium arsenide and the substrate is gallium arsenide or indium phosphide.

7. A method as claimed in claim 2 wherein the band edge spectrum is measured in an optical measurement configuration in which the light source and the wavelength selective detection system are both on the same side of the substrate.

8. A method as claimed in claim 2 wherein the substrate material is gallium arsenide or indium phosphide.

9. A method as claimed in claim 2 wherein the term proportional to the width of the knee is adjusted to correct for the effect of a wavelength dependent throughput in the wavelength selective detection system.

10. A method as claimed in claim 2 wherein the term that is added to the determined knee position corrects for the effect of differences in the scattering properties of the substrate relative to the scattering properties of a reference substrate.

11. A method as claimed in claim 1 wherein the temperature is computed from the measured position of the knee and the width of the knee while a thin film is being deposited on the semiconductor substrate.

12. A method as claimed in claim 1 wherein the temperature is obtained by comparing the corrected knee position with the calibration curve, and the corrected knee position is obtained from an Explicit Linear Knee Position Correction Equation.

13. A method as claimed in claim 1 wherein the width of the knee is used to correct the determined knee position for the effects of a time dependent change in the optical throughput of the detection system.

14. A method as claimed in claim 13 wherein a time dependence in the optical throughput is caused by sample rotation.

15. A method as claimed in claim 1 wherein the determined position and the width of the knee of the band edge spectrum are determined by a fit to a function which has an asymptotic linear behavior away from the knee of the spectrum.

16. A method for measuring substrate temperature as in claim 15 wherein the asymptotic linear function is the Exponential Knee Equation expressed as a function of photon energy or wavelength.

17. A method as claimed in claim 1 wherein the band edge spectrum is determined in an optical measurement configuration in which the light source and wavelength selective detection system are located on opposite sides of the substrate.

18. A method as claimed in claim 1 wherein the corrected position of the knee is determined by adding a term to the determined knee position that is proportional to a logarithm of the substrate thickness in order to correct for the effect of a difference in thickness of the substrate and a reference substrate.

19. An optical method for measuring the temperature of a semiconductor substrate material in a process chamber comprising:

(a) emitting radiation from a light source thereby causing broad spectrum radiation to be incident upon the substrate;

(b) using a wavelength selective detection system to measure a band edge spectrum of the substrate;

(c) analyzing the band edge spectrum to determine the position of a knee of the spectrum;

(d) determining a corrected knee position by adding a term to the determined knee position that corrects for the effects of changes in the positions of the light source or the wavelength selective detection system relative to their positions in the determination of a calibration curve, the term being proportional to the logarithm of an optical path length in the substrate, and;

(e) computing the temperature of the substrate by comparing the corrected knee position, with the position of a knee in a calibration curve from a reference substrate.

* * * * *